United States Patent
Kumar et al.

(10) Patent No.: US 9,752,015 B2
(45) Date of Patent: Sep. 5, 2017

(54) FILLED POLYMERIC COMPOSITES INCLUDING SHORT LENGTH FIBERS

(71) Applicants: Amitabha Kumar, San Antonio, TX (US); Guy Crocco, New Braunfels, TX (US); Russell L. Hill, San Antonio, TX (US); Li Ai, San Antonio, TX (US); Jacob Myers, Rock Hill, SC (US)

(72) Inventors: Amitabha Kumar, San Antonio, TX (US); Guy Crocco, New Braunfels, TX (US); Russell L. Hill, San Antonio, TX (US); Li Ai, San Antonio, TX (US); Jacob Myers, Rock Hill, SC (US)

(73) Assignee: Boral IP Holdings (Australia) PTY Limited, North Sydney (AU)

( * ) Notice: Subject to any disclaimer, the term of this patent is extended or adjusted under 35 U.S.C. 154(b) by 0 days.

(21) Appl. No.: 14/889,094

(22) PCT Filed: Aug. 5, 2014

(86) PCT No.: PCT/US2014/049735
§ 371 (c)(1),
(2) Date: Nov. 4, 2015

(87) PCT Pub. No.: WO2016/022103
PCT Pub. Date: Feb. 11, 2016

(65) Prior Publication Data
US 2016/0280890 A1  Sep. 29, 2016

(51) Int. Cl.
| | |
|---|---|
| C08K 7/04 | (2006.01) |
| C08K 7/14 | (2006.01) |
| C08K 11/00 | (2006.01) |
| C08K 3/00 | (2006.01) |
| C08K 7/02 | (2006.01) |
| C08K 9/06 | (2006.01) |
| C08L 101/00 | (2006.01) |

(52) U.S. Cl.
CPC .............. *C08K 11/005* (2013.01); *C08K 3/00* (2013.01); *C08K 3/0033* (2013.01); *C08K 7/02* (2013.01); *C08K 7/04* (2013.01); *C08K 7/14* (2013.01); *C08K 9/06* (2013.01); *C08K 11/00* (2013.01); *C08L 101/00* (2013.01); *C08K 2201/003* (2013.01); *C08K 2201/004* (2013.01)

(58) Field of Classification Search
CPC ........... C08K 11/005; C08K 7/14; C08K 7/04
See application file for complete search history.

(56) References Cited

U.S. PATENT DOCUMENTS

| | | |
|---|---|---|
| 529,535 A | 11/1894 | Smith |
| 529,538 A | 11/1894 | Vaughan |
| 2,526,033 A | 10/1950 | Lyon |
| 2,817,875 A | 12/1957 | Harris et al. |
| 2,902,388 A | 9/1959 | Szukiewicz |
| 2,983,693 A | 5/1961 | Sievers |
| 3,065,500 A | 11/1962 | Berner |
| 3,071,297 A | 1/1963 | Lee |
| 3,078,512 A | 2/1963 | De Haven |
| 3,223,027 A | 12/1965 | Soda et al. |
| 3,262,151 A | 7/1966 | Oxel |
| 3,269,961 A | 8/1966 | Bruson et al. |
| 3,308,218 A | 3/1967 | Wiegand et al. |
| 3,466,705 A | 9/1969 | Richie |
| 3,499,848 A | 3/1970 | Weisman |
| 3,528,126 A | 9/1970 | Ernst et al. |
| 3,566,448 A | 3/1971 | Ernst |
| 3,619,268 A | 11/1971 | Robertson et al. |
| 3,642,964 A | 2/1972 | Rausch et al. |
| 3,644,168 A | 2/1972 | Bonk et al. |
| 3,698,731 A | 10/1972 | Jost et al. |
| 3,726,624 A | 4/1973 | Schwarz |
| 3,736,081 A | 5/1973 | Yovanvich |
| 3,738,895 A | 6/1973 | Paymal |
| 3,764,247 A | 10/1973 | Garrett et al. |
| 3,768,937 A | 10/1973 | Haga et al. |
| 3,774,428 A | 11/1973 | Derry et al. |
| 3,802,582 A | 4/1974 | Brock |
| 3,816,043 A | 6/1974 | Snelling et al. |
| 3,819,574 A | 6/1974 | Brown et al. |

(Continued)

FOREIGN PATENT DOCUMENTS

| | | |
|---|---|---|
| CA | 2037130 | 1/2006 |
| CN | 1251596 | 4/2000 |

(Continued)

OTHER PUBLICATIONS

Anonymous. "Rigid polyurethane foams having a strut/window mass ratio in the range of 90/10 to 10/90, made via extrusion." Research Disclosure. Journal No. 40264, Published Oct. 1997.
Anonymous. "Cellular plastics made by extrusion." Research Disclosure. Journal No. 40204, Published Oct. 1997.
Bayer Material Science Product Information, Multranol 3900, Jan. 2006.
Bayer Material Science, Arcol LG-56-Polyether Polyol, CAS No. 25791-96-2, Product Code: KLLG56 (2003).
Bayer Material Science, Multranol 4035—Polyether Polyol, CAS No. 9049-71-2, Product Code: K114 (1997).
International Search Report and Written Opinion issued in related International Application No. PCT/US2014/049735 on May 15, 2015.

(Continued)

*Primary Examiner* — Robert Harlan
(74) *Attorney, Agent, or Firm* — Meunier Carlin & Curfman LLC

(57) ABSTRACT

Polymeric composites and methods for preparing the composites are described herein. The polymeric composites can comprise a polymer, an inorganic filler, and a plurality of short length fibers. The polymer in the composites can include homopolymers and copolymers and can also include plastics, resins, elastomers, thermoplastics, thermosets, and hot melts. The inorganic filler can be fly ash. The short length fibers can have an average length of 650 μm or less. Methods for making the polymeric composites are also described.

23 Claims, 2 Drawing Sheets

(56) References Cited

U.S. PATENT DOCUMENTS

| | | |
|---|---|---|
| 3,824,057 A | 7/1974 | Kornylak et al. |
| 3,830,776 A | 8/1974 | Carlson et al. |
| 3,832,429 A | 8/1974 | Charpentier et al. |
| 3,841,390 A | 10/1974 | DiBenedetto et al. |
| 3,843,757 A | 10/1974 | Ehrenfreund et al. |
| 3,852,387 A | 12/1974 | Bortnick et al. |
| 3,867,494 A | 2/1975 | Rood et al. |
| 3,878,027 A | 4/1975 | Troutner |
| 3,890,077 A | 6/1975 | Holman |
| 3,910,179 A | 10/1975 | Troutner |
| 3,917,547 A | 11/1975 | Massey |
| 3,917,774 A | 11/1975 | Sagane et al. |
| 3,928,258 A | 12/1975 | Alexander |
| 3,963,679 A | 6/1976 | Ullrich et al. |
| 3,981,654 A | 9/1976 | Rood et al. |
| 3,991,005 A | 11/1976 | Wallace |
| 3,999,230 A | 12/1976 | Bruning et al. |
| 3,999,320 A | 12/1976 | Zaubzer |
| 4,005,035 A | 1/1977 | Deaver |
| 4,042,314 A | 8/1977 | Bruning et al. |
| 4,051,742 A | 10/1977 | Johansson et al. |
| 4,060,579 A | 11/1977 | Schmitzer et al. |
| 4,065,410 A | 12/1977 | Schäfer et al. |
| 4,073,840 A | 2/1978 | Saidla |
| 4,078,032 A | 3/1978 | Wenner |
| 4,092,276 A | 5/1978 | Narayan |
| 4,104,094 A | 8/1978 | Peterson |
| 4,107,248 A | 8/1978 | Schlieckmann |
| 4,120,626 A | 10/1978 | Keller |
| 4,127,040 A | 11/1978 | Moore et al. |
| 4,128,369 A | 12/1978 | Kemerer et al. |
| 4,137,200 A | 1/1979 | Wood et al. |
| 4,137,265 A | 1/1979 | Edwards et al. |
| 4,141,662 A | 2/1979 | Hepper et al. |
| 4,141,862 A | 2/1979 | Raden et al. |
| 4,143,759 A | 3/1979 | Paradis |
| 4,149,840 A | 4/1979 | Tippman |
| 4,153,766 A | 5/1979 | Koide et al. |
| 4,153,768 A | 5/1979 | Blount |
| 4,160,749 A | 7/1979 | Schneider et al. |
| 4,160,853 A | 7/1979 | Ammons |
| 4,163,824 A | 8/1979 | Saidla |
| 4,164,439 A | 8/1979 | Coonrod |
| 4,164,526 A | 8/1979 | Clay et al. |
| 4,165,414 A | 8/1979 | Narayan et al. |
| 4,180,538 A | 12/1979 | Morikawa et al. |
| 4,200,699 A | 4/1980 | Treadwell |
| 4,209,605 A | 6/1980 | Hoy et al. |
| 4,210,572 A | 7/1980 | Herman et al. |
| 4,214,864 A | 7/1980 | Tabler |
| 4,221,877 A | 9/1980 | Cuscurida et al. |
| 4,240,950 A | 12/1980 | Von Bonin et al. |
| 4,241,131 A | 12/1980 | Bailey |
| 4,243,755 A | 1/1981 | Marx et al. |
| 4,247,656 A | 1/1981 | Janssen |
| 4,248,957 A | 2/1981 | Sander et al. |
| 4,248,975 A | 2/1981 | Satterly |
| 4,251,428 A | 2/1981 | Recker et al. |
| 4,254,002 A | 3/1981 | Sperling et al. |
| 4,254,176 A | 3/1981 | Müller et al. |
| 4,256,846 A | 3/1981 | Ohashi et al. |
| 4,260,538 A | 4/1981 | Iseler et al. |
| 4,261,946 A | 4/1981 | Goyert et al. |
| 4,272,377 A | 6/1981 | Gerlach et al. |
| 4,275,033 A | 6/1981 | Schulte et al. |
| 4,276,337 A | 6/1981 | Coonrod |
| 4,282,988 A | 8/1981 | Hulbert, Jr. |
| 4,284,826 A | 8/1981 | Aelony |
| 4,290,248 A | 9/1981 | Kemerer et al. |
| 4,300,776 A | 11/1981 | Taubenmann |
| 4,330,494 A | 5/1982 | Iwata et al. |
| 4,330,634 A | 5/1982 | Rodaway |
| 4,331,726 A | 5/1982 | Cleary |
| 4,338,422 A | 7/1982 | Jackson, Jr. et al. |
| 4,339,366 A | 7/1982 | Blount |
| 4,342,847 A | 8/1982 | Goyert et al. |
| 4,344,873 A | 8/1982 | Wick |
| 4,347,281 A | 8/1982 | Futcher et al. |
| 4,359,359 A | 11/1982 | Gerlach et al. |
| 4,359,548 A | 11/1982 | Blount |
| 4,366,204 A | 12/1982 | Briggs |
| 4,367,259 A | 1/1983 | Fulmer et al. |
| 4,376,171 A | 3/1983 | Blount |
| 4,378,171 A | 3/1983 | Schmidt |
| 4,381,352 A | 4/1983 | McBrayer |
| 4,382,056 A | 5/1983 | Coonrod |
| 4,383,818 A | 5/1983 | Swannell |
| 4,390,581 A | 6/1983 | Cogswell et al. |
| 4,395,214 A | 7/1983 | Phipps et al. |
| 4,396,791 A | 8/1983 | Mazzoni |
| 4,397,983 A | 8/1983 | Hill et al. |
| 4,412,033 A | 10/1983 | LaBelle et al. |
| 4,421,871 A | 12/1983 | Korczak et al. |
| 4,439,548 A | 3/1984 | Weisman |
| 4,450,133 A | 5/1984 | Cafarelli |
| 4,460,737 A | 7/1984 | Evans et al. |
| 4,465,500 A | 8/1984 | Motsinger et al. |
| 4,483,727 A | 11/1984 | Eickman et al. |
| 4,489,023 A | 12/1984 | Proksa |
| 4,512,942 A | 4/1985 | Babbin et al. |
| 4,514,162 A | 4/1985 | Schulz |
| 4,521,428 A | 6/1985 | Nisato et al. |
| 4,532,098 A | 7/1985 | Campbell et al. |
| 4,540,357 A | 9/1985 | Campbell et al. |
| 4,546,120 A | 10/1985 | Peerman et al. |
| 4,568,702 A | 2/1986 | Mascioli |
| 4,576,718 A | 3/1986 | Reischl et al. |
| 4,581,186 A | 4/1986 | Larson |
| 4,595,709 A | 6/1986 | Reischl |
| 4,597,927 A | 7/1986 | Zeitler et al. |
| 4,600,311 A | 7/1986 | Mourrier et al. |
| 4,604,410 A | 8/1986 | Altenberg |
| 4,649,162 A | 3/1987 | Roche et al. |
| 4,661,533 A | 4/1987 | Stobby |
| 4,667,157 A | 5/1987 | Ciammaichella et al. |
| 4,677,157 A | 6/1987 | Jacobs |
| 4,680,214 A | 7/1987 | Frisch et al. |
| 4,714,778 A | 12/1987 | Burgoyne, Jr. et al. |
| 4,717,027 A | 1/1988 | Laure et al. |
| 4,728,287 A | 3/1988 | Niems |
| 4,728,288 A | 3/1988 | Niems |
| 4,737,524 A | 4/1988 | Ako et al. |
| 4,757,095 A | 7/1988 | Galan et al. |
| 4,758,602 A | 7/1988 | Trowell |
| 4,780,484 A | 10/1988 | Schubert et al. |
| 4,780,498 A | 10/1988 | Goerrissen et al. |
| 4,795,763 A | 1/1989 | Gluck et al. |
| 4,802,769 A | 2/1989 | Tanaka |
| 4,823,195 A | 4/1989 | Ito |
| 4,826,429 A | 5/1989 | Niems |
| 4,826,944 A | 5/1989 | Hoefer et al. |
| 4,835,195 A | 5/1989 | Rayfield et al. |
| 4,855,184 A | 8/1989 | Klun et al. |
| 4,892,891 A | 1/1990 | Close |
| 4,895,352 A | 1/1990 | Stumpf |
| 4,948,859 A | 8/1990 | Echols et al. |
| 4,995,801 A | 2/1991 | Hehl |
| 5,001,165 A | 3/1991 | Canaday et al. |
| 5,010,112 A | 4/1991 | Glicksman et al. |
| 5,028,648 A | 7/1991 | Famili et al. |
| 5,033,860 A | 7/1991 | Nakamura |
| 5,047,495 A | 9/1991 | Kolycheck |
| 5,051,222 A | 9/1991 | Marten et al. |
| 5,053,274 A | 10/1991 | Jonas |
| 5,064,293 A | 11/1991 | Nakamura |
| 5,075,417 A | 12/1991 | Trowell et al. |
| 5,091,436 A | 2/1992 | Frisch et al. |
| 5,094,798 A | 3/1992 | Hewitt |
| 5,096,993 A | 3/1992 | Smith et al. |
| 5,102,918 A | 4/1992 | Moriya |
| 5,102,969 A | 4/1992 | Scheffler et al. |
| 5,114,630 A | 5/1992 | Newman et al. |
| 5,128,379 A | 7/1992 | Stone |
| 5,149,722 A | 9/1992 | Soukup |

(56) References Cited

U.S. PATENT DOCUMENTS

| | | |
|---|---|---|
| 5,149,739 A | 9/1992 | Lee |
| 5,159,012 A | 10/1992 | Doesburg et al. |
| 5,166,301 A | 11/1992 | Jacobs |
| 5,167,899 A | 12/1992 | Jezic |
| 5,185,420 A | 2/1993 | Smith et al. |
| 5,186,539 A | 2/1993 | Manser et al. |
| 5,229,138 A | 7/1993 | Carotti |
| 5,252,697 A | 10/1993 | Jacobs et al. |
| 5,271,699 A | 12/1993 | Barre et al. |
| 5,278,195 A | 1/1994 | Volkert et al. |
| 5,295,545 A | 3/1994 | Passamaneck |
| 5,296,545 A | 3/1994 | Heise |
| 5,296,546 A | 3/1994 | Kishida et al. |
| 5,300,531 A | 4/1994 | Weaver |
| 5,302,634 A | 4/1994 | Mushovic |
| 5,330,341 A | 7/1994 | Kemerer et al. |
| 5,331,044 A | 7/1994 | Lausberg et al. |
| 5,340,300 A | 8/1994 | Saeki et al. |
| 5,344,490 A | 9/1994 | Roosen et al. |
| 5,361,945 A | 11/1994 | Johanson |
| 5,369,147 A | 11/1994 | Mushovic |
| 5,375,988 A | 12/1994 | Klahre |
| 5,401,785 A | 3/1995 | Kumagai et al. |
| 5,424,013 A | 6/1995 | Lieberman |
| 5,424,014 A | 6/1995 | Glorioso et al. |
| 5,432,204 A | 7/1995 | Farkas |
| 5,439,711 A | 8/1995 | Vu et al. |
| 5,451,615 A | 9/1995 | Birch |
| 5,453,231 A | 9/1995 | Douglas |
| 5,455,312 A | 10/1995 | Heidingsfeld et al. |
| 5,458,477 A | 10/1995 | Kemerer et al. |
| 5,489,646 A | 2/1996 | Tatman et al. |
| 5,491,174 A | 2/1996 | Grier et al. |
| 5,495,640 A | 3/1996 | Mullet et al. |
| 5,505,599 A | 4/1996 | Kemerer et al. |
| 5,508,315 A | 4/1996 | Mushovic |
| 5,512,319 A | 4/1996 | Cook et al. |
| 5,514,430 A | 5/1996 | Andersen et al. |
| 5,522,446 A | 6/1996 | Mullet et al. |
| 5,527,172 A | 6/1996 | Graham, Jr. |
| 5,532,065 A | 7/1996 | Gubitz et al. |
| 5,536,781 A | 7/1996 | Heidingsfeld et al. |
| 5,554,713 A | 9/1996 | Freeland |
| 5,556,458 A | 9/1996 | Brook et al. |
| 5,562,141 A | 10/1996 | Mullet et al. |
| 5,565,497 A | 10/1996 | Godbey et al. |
| 5,566,740 A | 10/1996 | Mullet et al. |
| 5,567,791 A | 10/1996 | Br auer et al. |
| 5,569,713 A | 10/1996 | Lieberman |
| 5,582,840 A | 12/1996 | Pauw et al. |
| 5,582,849 A | 12/1996 | Lupke |
| 5,604,266 A | 2/1997 | Mushovic |
| 5,611,976 A | 3/1997 | Klier et al. |
| 5,621,024 A | 4/1997 | Eberhardt et al. |
| 5,631,103 A | 5/1997 | Eschbach et al. |
| 5,631,319 A | 5/1997 | Reese et al. |
| 5,634,953 A | 6/1997 | Wissmann |
| 5,643,516 A | 7/1997 | Raza et al. |
| 5,681,915 A | 10/1997 | Lechner et al. |
| 5,688,890 A | 11/1997 | Ishiguro et al. |
| 5,700,495 A | 12/1997 | Kemerer et al. |
| 5,710,231 A | 1/1998 | Fogg et al. |
| 5,721,699 A | 2/1998 | DeVilbiss |
| 5,723,506 A | 3/1998 | Glorioso et al. |
| 5,728,337 A | 3/1998 | Yoshikawa et al. |
| 5,759,695 A | 6/1998 | Primeaux, II |
| 5,760,133 A | 6/1998 | Heidingsfeld et al. |
| 5,769,281 A | 6/1998 | Bates |
| 5,782,283 A | 7/1998 | Kendall |
| 5,783,125 A | 7/1998 | Bastone et al. |
| 5,783,629 A | 7/1998 | Srinivasan et al. |
| 5,791,085 A | 8/1998 | Szmidt et al. |
| 5,795,949 A | 8/1998 | Daute et al. |
| 5,798,533 A | 8/1998 | Fishback et al. |
| 5,811,506 A | 9/1998 | Slagel |
| 5,817,402 A | 10/1998 | Miyake et al. |
| 5,836,499 A | 11/1998 | Mullet et al. |
| 5,844,015 A | 12/1998 | Steilen et al. |
| 5,862,144 A | 1/1999 | Lee et al. |
| 5,908,573 A | 6/1999 | Chiles et al. |
| 5,908,701 A | 6/1999 | Jennings et al. |
| 5,929,153 A | 7/1999 | Mori et al. |
| 5,934,352 A | 8/1999 | Morgan |
| 5,945,460 A | 8/1999 | Ekart et al. |
| 5,952,053 A | 9/1999 | Colby |
| 5,962,144 A | 10/1999 | Primeaux, II |
| 5,981,655 A | 11/1999 | Heidingsfeld et al. |
| 6,000,102 A | 12/1999 | Lychou |
| 6,019,269 A | 2/2000 | Mullet et al. |
| 6,020,387 A | 2/2000 | Downey et al. |
| 6,040,381 A | 3/2000 | Jennings et al. |
| 6,044,512 A | 4/2000 | Hornby et al. |
| 6,051,634 A | 4/2000 | Laas et al. |
| 6,055,781 A | 5/2000 | Johanson |
| 6,060,531 A | 5/2000 | Horn et al. |
| 6,062,719 A | 5/2000 | Busby et al. |
| 6,086,802 A | 7/2000 | Levera et al. |
| 6,096,401 A | 8/2000 | Jenkines |
| 6,103,340 A | 8/2000 | Kubo et al. |
| 6,107,355 A | 8/2000 | Horn et al. |
| 6,107,433 A | 8/2000 | Petrovic et al. |
| 6,120,905 A | 9/2000 | Figovsky |
| 6,136,246 A | 10/2000 | Rauwendaal et al. |
| 6,136,870 A | 10/2000 | Triolo et al. |
| 6,140,381 A | 10/2000 | Rosthauser et al. |
| 6,166,109 A | 12/2000 | Spitler et al. |
| 6,177,232 B1 | 1/2001 | Melisaris et al. |
| 6,180,192 B1 | 1/2001 | Smith et al. |
| 6,180,686 B1 | 1/2001 | Kurth |
| RE37,095 E | 3/2001 | Glorioso et al. |
| 6,204,312 B1 | 3/2001 | Taylor |
| 6,211,259 B1 | 4/2001 | Borden et al. |
| 6,220,745 B1 | 4/2001 | Kobayashi et al. |
| 6,224,797 B1 | 5/2001 | Franzen et al. |
| 6,234,777 B1 | 5/2001 | Sperry et al. |
| 6,252,031 B1 | 6/2001 | Tsutsumi et al. |
| 6,257,643 B1 | 7/2001 | Young |
| 6,257,644 B1 | 7/2001 | Young |
| 6,258,310 B1 | 7/2001 | Sardanopoli et al. |
| 6,258,917 B1 | 7/2001 | Slagel |
| 6,264,462 B1 | 7/2001 | Gallagher |
| 6,271,276 B1 | 8/2001 | Gribble et al. |
| 6,284,841 B1 | 9/2001 | Friesner |
| 6,294,637 B1 | 9/2001 | Braüer et al. |
| 6,297,321 B1 | 10/2001 | Onder et al. |
| 6,309,507 B1 | 10/2001 | Morikawa et al. |
| 6,312,244 B1 | 11/2001 | Levera et al. |
| 6,321,904 B1 | 11/2001 | Mitchell |
| 6,329,448 B1 | 12/2001 | Gutsche et al. |
| 6,331,577 B1 | 12/2001 | Volkert et al. |
| 6,343,924 B1 | 2/2002 | Klepsch |
| 6,348,514 B1 | 2/2002 | Calabrese et al. |
| 6,362,252 B1 | 3/2002 | Prutkin |
| 6,383,599 B1 | 5/2002 | Bell et al. |
| 6,387,504 B1 | 5/2002 | Mushovic |
| 6,409,949 B1 | 6/2002 | Tanaka et al. |
| 6,422,926 B1 | 7/2002 | McLain et al. |
| 6,429,257 B1 | 8/2002 | Buxton et al. |
| 6,432,335 B1 | 8/2002 | Ladang et al. |
| 6,433,032 B1 | 8/2002 | Hamilton |
| 6,433,121 B1 | 8/2002 | Petrovic et al. |
| 6,455,605 B1 | 9/2002 | Giorgini et al. |
| 6,455,606 B1 | 9/2002 | Kaku et al. |
| 6,458,866 B1 | 10/2002 | Oppermann et al. |
| 6,465,569 B1 | 10/2002 | Kurth |
| 6,467,610 B1 | 10/2002 | MacLachlan |
| 6,469,667 B2 | 10/2002 | Fox et al. |
| 6,485,665 B1 | 11/2002 | Hermanutz et al. |
| 6,486,224 B2 | 11/2002 | Lin et al. |
| 6,495,772 B2 | 12/2002 | Anstrom et al. |
| 6,534,617 B1 | 3/2003 | Batt et al. |
| 6,541,534 B2 | 4/2003 | Allen et al. |
| 6,552,660 B1 | 4/2003 | Lisowski |
| 6,555,199 B1 | 4/2003 | Jenkines |

(56) References Cited

U.S. PATENT DOCUMENTS

| | | |
|---|---|---|
| 6,571,935 B1 | 6/2003 | Campbell et al. |
| 6,573,309 B1 | 6/2003 | Reitenbach et al. |
| 6,573,354 B1 | 6/2003 | Petrovic et al. |
| 6,578,619 B2 | 6/2003 | Wright |
| 6,579,932 B1 | 6/2003 | Schipper et al. |
| 6,586,490 B1 | 7/2003 | Dietrich et al. |
| 6,604,848 B2 | 8/2003 | Tanaka et al. |
| 6,605,343 B1 | 8/2003 | Motoi et al. |
| 6,609,638 B1 | 8/2003 | Lott |
| 6,613,823 B1 | 9/2003 | Battiste et al. |
| 6,613,827 B2 | 9/2003 | Lundgard et al. |
| 6,616,886 B2 | 9/2003 | Peterson et al. |
| 6,617,009 B1 | 9/2003 | Chen et al. |
| 6,624,244 B2 | 9/2003 | Kurth |
| 6,641,384 B2 | 11/2003 | Bosler et al. |
| 6,641,658 B1 | 11/2003 | Dubey |
| 6,649,084 B2 | 11/2003 | Morikawa et al. |
| 6,649,667 B2 | 11/2003 | Clatty |
| 6,686,435 B1 | 2/2004 | Petrovic et al. |
| 6,695,902 B2 | 2/2004 | Hemmings et al. |
| 6,706,774 B2 | 3/2004 | Münzenberger et al. |
| 6,767,399 B2 | 7/2004 | Peev et al. |
| 6,769,220 B2 | 8/2004 | Friesner |
| 6,832,430 B1 | 12/2004 | Ogawa et al. |
| 6,841,111 B2 | 1/2005 | Rickner et al. |
| 6,849,676 B1 | 2/2005 | Shibano et al. |
| 6,855,844 B1 | 2/2005 | Geiger et al. |
| 6,864,296 B2 | 3/2005 | Kurth |
| 6,867,239 B2 | 3/2005 | Kurth |
| 6,871,457 B2 | 3/2005 | Quintero-Flores et al. |
| 6,881,763 B2 | 4/2005 | Kurth |
| 6,881,764 B2 | 4/2005 | Doesburg et al. |
| 6,903,156 B2 | 6/2005 | Müller et al. |
| 6,908,573 B2 | 6/2005 | Hossan |
| 6,916,863 B2 | 7/2005 | Hemmings et al. |
| 6,958,365 B2 | 10/2005 | Dontula et al. |
| 6,962,636 B2 | 11/2005 | Kurth et al. |
| 6,971,495 B2 | 12/2005 | Hedrick et al. |
| 6,979,477 B2 | 12/2005 | Kurth et al. |
| 6,979,704 B1 | 12/2005 | Mayer et al. |
| 6,989,123 B2 | 1/2006 | Lee et al. |
| 6,997,346 B2 | 2/2006 | Landers et al. |
| 7,063,877 B2 | 6/2006 | Kurth et al. |
| 7,132,459 B1 | 11/2006 | Buchel |
| 7,160,976 B2 | 1/2007 | Lühmann et al. |
| 7,188,992 B2 | 3/2007 | Mattingly, Jr. |
| 7,196,124 B2 | 3/2007 | Parker et al. |
| 7,211,206 B2 | 5/2007 | Brown et al. |
| 7,267,288 B2 | 9/2007 | Wheeler, Jr. et al. |
| 7,316,559 B2 | 1/2008 | Taylor |
| 7,316,659 B2 | 1/2008 | Lofberg |
| 7,491,351 B2 | 2/2009 | Taylor et al. |
| 7,579,068 B2 | 8/2009 | Allen et al. |
| 7,651,645 B2 | 1/2010 | Taylor |
| 7,763,341 B2 | 7/2010 | Brown |
| 7,776,934 B2 | 8/2010 | Lekovic et al. |
| 7,794,224 B2 | 9/2010 | Butteriss |
| 7,794,817 B2 | 9/2010 | Brown |
| 8,024,818 B1 | 9/2011 | Davenport |
| 8,030,364 B2 | 10/2011 | Kim et al. |
| 8,088,217 B2 | 1/2012 | Francis |
| 8,114,267 B2 | 2/2012 | Nordlinder |
| 8,177,909 B2 | 5/2012 | Constantz et al. |
| 8,227,656 B2 | 7/2012 | Svetlik |
| 8,313,802 B2 | 11/2012 | Riman et al. |
| 2001/0009683 A1 | 7/2001 | Kithama et al. |
| 2002/0034598 A1 | 3/2002 | Bonk et al. |
| 2002/0040071 A1 | 4/2002 | Lin et al. |
| 2002/0045048 A1 | 4/2002 | Bonk et al. |
| 2002/0048643 A1 | 4/2002 | Bonk et al. |
| 2002/0086913 A1 | 7/2002 | Roels et al. |
| 2002/0098362 A1 | 7/2002 | Mushovic |
| 2002/0119300 A1 | 8/2002 | Taylor |
| 2002/0122929 A1 | 9/2002 | Simpson et al. |
| 2002/0171164 A1 | 11/2002 | Halterbaum et al. |
| 2002/0192456 A1 | 12/2002 | Mashburn et al. |
| 2003/0004232 A1 | 1/2003 | Ruede |
| 2003/0021915 A1 | 1/2003 | Rohatgi et al. |
| 2003/0047836 A1 | 3/2003 | Rickner et al. |
| 2003/0065045 A1 | 4/2003 | Falke et al. |
| 2003/0083394 A1 | 5/2003 | Clatty |
| 2003/0090016 A1 | 5/2003 | Petrovic et al. |
| 2003/0143910 A1 | 7/2003 | Mashburn et al. |
| 2003/0158365 A1 | 8/2003 | Brauer et al. |
| 2003/0166735 A1 | 9/2003 | Clatty |
| 2003/0232933 A1 | 12/2003 | Lagneaux et al. |
| 2004/0014830 A1 | 1/2004 | Wiese et al. |
| 2004/0048055 A1 | 3/2004 | Branca |
| 2004/0049002 A1 | 3/2004 | Andrews et al. |
| 2004/0121161 A1 | 6/2004 | Shugert et al. |
| 2004/0122119 A1 | 6/2004 | Burgess et al. |
| 2004/0144287 A1 | 7/2004 | Tardif et al. |
| 2004/0162360 A1 | 8/2004 | Kiso et al. |
| 2004/0176486 A1 | 9/2004 | Glorioso et al. |
| 2004/0198900 A1 | 10/2004 | Madaj |
| 2004/0247857 A1 | 12/2004 | Schroeder et al. |
| 2004/0266993 A1 | 12/2004 | Evans |
| 2005/0011159 A1 | 1/2005 | Standal et al. |
| 2005/0013793 A1 | 1/2005 | Beckman et al. |
| 2005/0031578 A1 | 2/2005 | Deslauriers et al. |
| 2005/0032925 A1 | 2/2005 | Kaplan |
| 2005/0070620 A1 | 3/2005 | Herrington et al. |
| 2005/0079339 A1 | 4/2005 | Riddle |
| 2005/0131092 A1 | 6/2005 | Kurth et al. |
| 2005/0131093 A1 | 6/2005 | Kurth et al. |
| 2005/0161855 A1 | 7/2005 | Brown |
| 2005/0163939 A1 | 7/2005 | Moehl et al. |
| 2005/0163969 A1 | 7/2005 | Brown |
| 2005/0171243 A1 | 8/2005 | Hemmings et al. |
| 2005/0182228 A1 | 8/2005 | Kurth |
| 2005/0197413 A1 | 9/2005 | Grimm et al. |
| 2005/0208167 A1 | 9/2005 | You et al. |
| 2005/0222303 A1 | 10/2005 | Cernohous et al. |
| 2005/0260351 A1 | 11/2005 | Kurth et al. |
| 2005/0281999 A1 | 12/2005 | Hofmann et al. |
| 2005/0287238 A1 | 12/2005 | Taylor |
| 2006/0003042 A1 | 1/2006 | Inoue et al. |
| 2006/0011159 A1 | 1/2006 | Bloms et al. |
| 2006/0014891 A1 | 1/2006 | Yang et al. |
| 2006/0041155 A1 | 2/2006 | Casper |
| 2006/0041156 A1 | 2/2006 | Casper et al. |
| 2006/0045899 A1 | 3/2006 | Sarangapani et al. |
| 2006/0071369 A1 | 4/2006 | Butteriss |
| 2006/0105145 A1 | 5/2006 | Brown |
| 2006/0115625 A1 | 6/2006 | Brown |
| 2006/0131791 A1 | 6/2006 | Nakamura et al. |
| 2006/0186571 A1 | 8/2006 | Brown |
| 2006/0186572 A1 | 8/2006 | Brown |
| 2006/0217517 A1 | 9/2006 | Daly |
| 2006/0235100 A1 | 10/2006 | Kaushiva et al. |
| 2006/0270747 A1 | 11/2006 | Griggs |
| 2006/0273486 A1 | 12/2006 | Taylor et al. |
| 2007/0022106 A1 | 1/2007 | Brandt et al. |
| 2007/0027227 A1 | 2/2007 | Shutov |
| 2007/0037953 A1 | 2/2007 | Geiger et al. |
| 2007/0052128 A1 | 3/2007 | Taylor |
| 2007/0056875 A1 | 3/2007 | Hlady et al. |
| 2007/0066697 A1 | 3/2007 | Gilder et al. |
| 2007/0197672 A1 | 8/2007 | Lekovic et al. |
| 2007/0222105 A1 | 9/2007 | Brown |
| 2007/0222106 A1 | 9/2007 | Brown |
| 2007/0225391 A1 | 9/2007 | Brown |
| 2007/0225419 A1 | 9/2007 | Brown |
| 2007/0261947 A1 | 11/2007 | Geerlings et al. |
| 2008/0029925 A1 | 2/2008 | Brown |
| 2008/0119578 A1 | 5/2008 | Prince et al. |
| 2008/0132611 A1 | 6/2008 | Brown |
| 2008/0237914 A1 | 10/2008 | Lustiger et al. |
| 2008/0241458 A1 | 10/2008 | Jenkines |
| 2009/0069117 A1 | 3/2009 | Kennedy et al. |
| 2009/0198036 A1 | 8/2009 | Duffy |
| 2009/0295021 A1 | 12/2009 | Brown |
| 2010/0022717 A1 | 1/2010 | Honma |
| 2010/0025882 A1 | 2/2010 | Taylor et al. |

(56) References Cited

U.S. PATENT DOCUMENTS

| | | |
|---|---|---|
| 2010/0201014 A1 | 8/2010 | Taylor |
| 2010/0230852 A1 | 9/2010 | Brown |
| 2010/0264559 A1 | 10/2010 | Brown |
| 2010/0292397 A1 | 11/2010 | Brown |
| 2010/0296361 A1 | 11/2010 | Brown |
| 2011/0059319 A1 | 3/2011 | Raday |
| 2011/0086933 A1 | 4/2011 | Herrington et al. |
| 2011/0086934 A1 | 4/2011 | Herrington et al. |
| 2011/0182799 A1 | 7/2011 | Riman et al. |
| 2011/0303156 A1 | 12/2011 | Sikka et al. |
| 2012/0029145 A1 | 2/2012 | Brown |
| 2012/0085264 A1 | 4/2012 | Zhang et al. |
| 2012/0312194 A1 | 12/2012 | Riman et al. |
| 2013/0059934 A1 | 3/2013 | Burgess et al. |
| 2013/0065980 A1 | 3/2013 | Yoshitomi |
| 2013/0072588 A1 | 3/2013 | Rosthauser et al. |
| 2013/0122267 A1 | 5/2013 | Riman et al. |
| 2013/0206040 A1 | 8/2013 | Zhang et al. |
| 2013/0284069 A1 | 10/2013 | Dubey |
| 2013/0284070 A1 | 10/2013 | Dubey |

FOREIGN PATENT DOCUMENTS

| | | |
|---|---|---|
| CN | 1052991 | 5/2000 |
| CN | 1926282 | 3/2007 |
| CN | 101033642 | 9/2007 |
| DE | 2351844 | 4/1975 |
| DE | 9318515 | 2/1994 |
| EP | 115374 | 8/1984 |
| EP | 0654297 | 5/1995 |
| EP | 0771827 | 5/1997 |
| EP | 1336461 | 5/2002 |
| GB | 790527 | 2/1958 |
| GB | 1152306 | 5/1969 |
| GB | 1246940 | 9/1971 |
| GB | 1314707 | 4/1973 |
| GB | 2300627 | 11/1996 |
| GB | 2347933 | 9/2000 |
| JP | 355080456 | 6/1980 |
| JP | 58-132533 | 8/1983 |
| JP | 63-022819 | 1/1988 |
| JP | 63-202408 | 8/1988 |
| JP | 07-076395 | 3/1995 |
| JP | 07-313941 | 12/1995 |
| JP | 08-157638 | 6/1996 |
| JP | 08-157638 A * | 6/1996 |
| JP | 08-188634 | 7/1996 |
| JP | 11-171960 | 6/1999 |
| JP | 2001-326361 | 11/2001 |
| JP | 2004-131654 | 4/2004 |
| JP | 2005-138567 | 6/2005 |
| KR | 2002-0086327 | 11/2002 |
| NZ | 226301 | 3/1990 |
| WO | 81/03026 | 10/1981 |
| WO | 87/05541 | 9/1987 |
| WO | 91/00304 | 1/1991 |
| WO | 92/07892 | 5/1992 |
| WO | 93/19110 | 9/1993 |
| WO | 93/24549 | 12/1993 |
| WO | 94/25529 | 11/1994 |
| WO | 94/27697 | 12/1994 |
| WO | 97/11114 | 3/1997 |
| WO | 97/44373 | 11/1997 |
| WO | 98/08893 | 3/1998 |
| WO | 99/37592 | 1/1999 |
| WO | 99/39891 | 8/1999 |
| WO | 00/17249 | 3/2000 |
| WO | 00/40650 | 7/2000 |
| WO | 01/18087 | 3/2001 |
| WO | 01/72863 | 10/2001 |
| WO | 01/85140 | 11/2001 |
| WO | 02/01530 | 1/2002 |
| WO | 02/068490 | 9/2002 |
| WO | 2004/078900 | 9/2004 |
| WO | 2004/113248 | 12/2004 |
| WO | 2005/053938 | 6/2005 |
| WO | 2005/056267 | 6/2005 |
| WO | 2005/072187 | 8/2005 |
| WO | 2005/072188 | 8/2005 |
| WO | 2005/094255 | 10/2005 |
| WO | 2005/123798 | 12/2005 |
| WO | 2006/012149 | 2/2006 |
| WO | 2006/137672 | 12/2006 |
| WO | 2007/112104 | 10/2007 |
| WO | 2007/112105 | 10/2007 |
| WO | 2008089481 | 7/2008 |
| WO | 2011019997 | 2/2011 |
| WO | 2011085365 | 7/2011 |
| WO | 2013/049401 | 4/2013 |

OTHER PUBLICATIONS

Bledzki, Andrzej K., et al., Impact Properties of Natural Fiber-Reinforced Epoxy Foams, Journal of Cellular Plastics, vol. 35, Nov. 1999, pp. 550-562.

Cayli et al., "Soybean Oil Based Isocyanates: Synthesis, Characterizations, and Polymerizations," Conference Abstract, 2nd Workshop on Fats and Oils as Renewable Feedstock for the Chemical Industry, Mar. 22-24, 2009.

Dolui, S.K., "Unusual effect of filler (CaCO3) on thermal degradation of polyurethane," Journal of Applied Polymer Science, 53(4): 463-465 (2003).

Guhanathan, S. et al., "Studies on Castor Oil-based Polyurethane/Polyacrylonitrile Interpenetrating Polymer Network for Toughening of Unsaturated Polyester Resin," Journal of Applied Polymer Science, 92:817-829 (2004).

Guo et al., "Polyols and Polyurethanes from Hydroformylation of Soybean Oil," Journal of Polymers and the Environment 10(1-2):49-52 (Apr. 2002).

Guo et al., "Rigid Urethane Foams from a Soy Polyol-Dod Hybrid," USDA Agricultural Research Service, http://ars.usda.gov/research/publications/publications.htm?SEQ-NO-115=145249 (May 9, 2003).

Hojabri et al., "Fatty Acid-Derived Diisocyanate and Biobased Polyurethane Produced from Vegetable Oil: Synthesis, Polymerization, and Characterization," Biomacromolecules, 10(4):884-891 (2009), abstract.

Ionescu, "Chemistry and Technology of Polyols for Polyurethanes," Rapra Technology Ltd,. (2005), pp. 535-550.

Inukai et al., "Glass Fiber Reinforced Rigid Polyurethane Foam (Elson Neo-Lumber FFU)," International Progress in Urethanes, vol. 5, Lancaster, PA, Technomic Publishing Co., Inc., 1988.

Javni, I. et al., "Thermal Stability of Polyurethanes Based on Vegetable Oils," Journal of Applied Polymer Science, 77:1723-1734 (2000).

Klempner, D., ed., et al., Excerpts from Handbook of Polymeric Foams and Foam Technology, 2d ed., 2004, pp. 121-124, 126, 128, 129, Hanser Publishers, Munich.

Krishnamurthi, B, et al.., Nano- and Micro-Fillers for Polyurethane Foams: Effect on Density and Mechanical Properties, Symposium, Sep. 30-Oct. 3, 2001, pp. 239-244, Polyurethanes Expo 2001, Columbus, OH.

Morimoto et al., "Continuous Glass Fiber Reinforced Rigid Polyurethane Foam (Airlite FRU)," International Progress in Urethanes, vol. 5, Lancaster, PA, Technomic Publishing Co., Inc., 1988.

National Center for Environmental Research and Quality Assurance, Office of Research and Development, U.S. Environmental Protection Agency, Abstract of "The Use of Multi-Component Waste Products for Use in Roofing Materials," May 9, 1998.

Nayak, P.L., "Natural Oil-Based Polymers: Opportunities and Challenges," J. Macro. Sci. Rev. Macro. Chem. & Phys., C40(1):1-21 (2000).

Nosker, Thomas J., et al., Fiber Orientation and Creation of Structural Plastic Lumber, Plastics Engineering, Jun. 1999, pp. 53-56.

Oertel, G., ed., Polyurethane Handbook Second Edition, pp. 136, 182-183, 252-253; Carl Hanser, Verlag, Munich (1994).

(56) References Cited

OTHER PUBLICATIONS

Okagawa et al., "Glass Fiber Reinforced Rigid Polyurethane Foam," Cellular and non cellular polyurethanes, Carl Hanser Verlag Munchen Wien Druck and Bindung, Germany, p. 453-467, 1980.
Okagawa, F., "Glass Fiber Reinforced Rigid Polyurethane Foam", International Progress in Urethane, vol. 2, Lancaster, PA, Technomic Publishing Co., Inc., 1980.
OSi Specialties, "Fomrez Tin Catalysts", 3 pages.
Petrovic et al., "Industrial Oil Products Program," AOCS Archives, (2007).
Pollack, "Soy vs. Petro Polyols a Life-Cycle Comparison," Omni Tech International, Ltd. (2002).
Rama, Shetty R. et al., Journal of Reinforced Plastics and Composites, 2010, 29:2099-2104 (Abstract).
Randall, D., ed., et. al., Excerpts from "The polyurethanes book", 2002, pp. 1, 166-167, 210-213, 229-231, 263-264, Dunholm Publicity Ltd., United Kingdom.
Shutov, F.A., Excerpts from Integral/Structural Polymer Foams: Technology, Properties and Applications, 1986, pp. including preface, 3-4, 8-9, 13, 23-25, 131-134, 153-158, 167, 171, 176-179, 256.
Soya-based isocyanate alternatives coming? (US Newslines), Apr. 1, 2007.
Standard Practice for Polyurethane Raw Materials: Polyurethane Foam Cup Test, ASTM D7487-08, 2008.
Szycher, Michael. 17.7.1 Foam Production by Extruder Method. Szycher's Handbook of Polyurethanes. pp. 17-21-17-22. Copyright 1999 by CRC Press LLC.
Woods, G., Excerpts from "The ICI Polyurethanes Book", 1987, pp. 119-120, 127, 135-140, 158-159, The Netherlands.
Wypych, G., Excerpts from "Fillers", 1993, pp. 4, 48, 57, ChemTech Publishing, Ontario Canada.

\* cited by examiner

FILLED POLYMERIC COMPOSITES INCLUDING SHORT LENGTH FIBERS

FIELD OF THE DISCLOSURE

This disclosure relates generally to filled polymers, more particularly, to the use of short length fibers in polymeric composites.

BACKGROUND OF THE DISCLOSURE

Organic-inorganic composite materials have become desirable for a variety of uses because of their excellent mechanical properties and weathering stability. In general, the superior properties of organic-inorganic composites are achieved through the use of the organic as a matrix material that acts as a glue with enhanced flexural properties or as a fibrous component providing reinforcement, improved tensile properties, and resistance to degradation from weathering of the composite when it is exposed to the environment. The inorganic material imparts various properties of rigidity, toughness, hardness, optical appearance and interaction with electromagnetic radiation, density, and many other physical and chemical attributes. Thus, organic-inorganic composite materials can be used in a variety of applications. Nevertheless, there is a continuing desire to improve the properties of filled composites.

SUMMARY OF THE DISCLOSURE

Polymeric composites and methods for preparing the composites are described herein. The polymeric composites can comprise a polymer, an inorganic filler, and a plurality of short length fibers. The polymer in the composites can include homopolymers and copolymers and can also include plastics, resins, elastomers, thermoplastics, thermosets, and hot melts.

The inorganic filler can be in an amount from 25% to 90% by weight of the polymeric composite. For example, the inorganic filler can be present in an amount from 50% to 80% by weight, based on the total weight of the composite. In some embodiments, the inorganic filler comprises fly ash.

The short length fibers can be any natural or synthetic fiber material, based on inorganic materials, organic materials, or combinations of both. Suitable short length fibers for use in the polymeric composites include mineral wool, cellulose, wood fiber, saw dust, wood shavings, cotton, lint, and combinations thereof. In some embodiments, the short length fiber is mineral wool. In some embodiments, the short length fibers are coated with an aminosilane. The short length fibers can be present in an amount of from 0.5% to 15% by weight, based on the total weight of the composite. The short length fibers can have an average length of 650 µm or less. For example, the short length fibers can have an average length of from 50 µm to 650 µm or from 100 µm to 250 µm. The short length fibers can have an average diameter of from 1 to 20 µm. The short length fibers can also be described by their average aspect ratio—the ratio of the length to the diameter. In some embodiments, the short length fibers in the polymeric composites can have an average aspect ratio of from 5:1 to 250:1 or from 8:1 to 250:1.

Suitable polymers for use in the polymeric composites include polyolefins, ethylene copolymers, polystyrenes, polyvinyl chlorides, polyvinylidene chlorides, polyvinyl acetates, polyacrylonitriles, polyamides, polyisobutylenes, polyacetals, chlorinated and fluorinated polymers, fluoroelastomers, fluorosilicones, polycarbonates, epoxies, phenolics, polyesters, acrylic polymers, acrylate polymers, polyurethanes, alkyds, silicones, styrene-butadiene copolymers, acrylonitrile-butadiene-styrene copolymers, nitrile rubbers, diallyl phthalates, melamines, polybutadienes, aramids, cellulosics, cellulose acetobutyrates, ionomers, parylenes, polyaryl ethers, polyaryl sulfones, polyarylene sulfides, polyethersulfones, polyallomers, polyimides, polyamideimides, polymethylpentenes, polyphenylene oxides, polyphenylene sulfides, polysulfones, polyetherketones, polyetherimides, polyaryleneketones, polychloroprenes, and blends thereof. The polymer can be present in an amount of from 10% to 60% by weight, based on the total weight of the composite.

In some embodiments, the polymer can be a polyurethane. The polyurethane can be formed by the reaction of at least one isocyanate selected from the group consisting of diisocyanates, polyisocyanates and mixtures thereof, and at least one polyol. The at least one polyol can comprise an aromatic polyester polyol. In some embodiments, the reaction can be in the presence of a catalyst.

The polymeric composites can further include a plurality of glass fibers having a minimum length of 1 mm (e.g., a minimum length of 3 mm). The glass fiber can be present in an amount from 0.5% to 10% by weight, based on the total weight of the composite.

Methods for making the polymeric composites are also described. The method can include mixing the inorganic filler, the short length fibers, and the polymer, to form a composite mixture. The composite mixture can have a viscosity of from 25 Pa·s to 250 Pa·s (e.g., from 80 Pa·s to 250 Pa·s). In some specific embodiments, where the polymer is a polyurethane, the method can include mixing an inorganic filler, at least one isocyanate selected from the group consisting of diisocyanates, polyisocyanates, and combinations thereof, at least one polyol, and the plurality of short length fibers to form the composite mixture. The method can further include allowing the at least one isocyanate and the at least one polyol to react in the presence of the inorganic filler, and the plurality of short length fibers to form the polymeric composite. In some embodiments, the composite mixture can further include a catalyst. In some embodiments, the composite mixture can also include a plurality of glass fibers having a minimum length of 1 mm (e.g., a minimum length of 3 mm).

DETAILED DESCRIPTION

Figure 1:
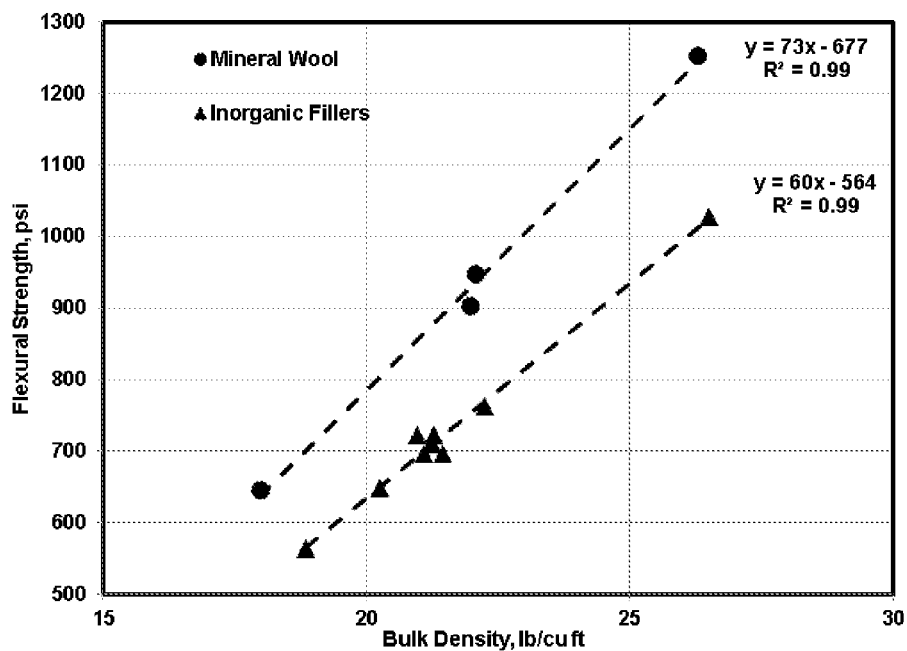
FIG. 1 is a graph showing the flexural strength of polyurethane composites with and without mineral wool, as a function of the composite's bulk density.

Polymeric composites and methods for preparing the composites are described herein. The polymeric composites can comprise a polymer, an inorganic filler, and a plurality of short length fibers.

The polymer in the composites can include homopolymers and copolymers and can include plastics, resins, elastomers, thermoplastics, thermosets, and hot melts. Polymers suitable for use in the polymeric composite include polyolefins (e.g., polyethylene or polypropylene), ethylene copolymers (e.g., ethylene-acrylic copolymers and ethylene-vinyl acetate copolymers), polystyrenes, polyvinyl chlorides, polyvinylidene chlorides, polyvinyl acetates, polyacrylonitriles, polyamides (e.g., nylon), polyisobutylenes, polyacetals, chlorinated and fluorinated polymers (e.g., PTFE), fluoroelastomers, fluorosilicones, polycarbonates, epoxies, phenolics, polyesters, acrylic polymers, acrylate polymers, polyurethanes, alkyds, silicones, styrene-butadiene (SB) copolymers, acrylonitrilebutadiene-styrene (ABS) copolymers, nitrile rubbers, diallyl phthalates, melamines, polybutadienes, aramids, cellulosics, cellulose acetobutyrates, ionomers, parylenes, polyaryl ethers, polyaryl sulfones, polyarylene sulfides, polyethersulfones, polyallomers, polyimides, polyamideimides, polymethylpentenes, polyphenylene oxides, polyphenylene sulfides, polysulfones, polyetherketones, polyetherimides, polyarylenekentones, polychloroprenes, and blends thereof. In some embodiments, the polymer includes polyethylene, polypropylene, polyvinyl chloride, nylon, epoxy, phenolic, polyester, acrylic polymer, acrylate polymer, polyurethane, styrene butadiene copolymer, acrylonitrile-butadiene-styrene copolymer, or a blend thereof.

In some embodiments, the polymer in the polymeric composite can be a polyurethane. The polyurethane composites can be formed using highly reactive systems such as highly reactive polyols, isocyanates, or both. For example, the composites can be formed by the reaction of at least one isocyanate, selected from the group consisting of diisocyanates, polyisocyanates, and mixtures thereof, and at least one polyol, in the presence of an inorganic filler. In some embodiments, the reaction can be in the presence of a catalyst.

Isocyanates suitable for use in the polyurethane composite described herein include one or more monomeric or oligomeric poly- or di-isocyanates. The monomeric or oligomeric poly- or di-isocyanate include aromatic diisocyanates and polyisocyanates. The isocyanates can also be blocked isocyanates, or pre-polymer isocyanates (e.g., castor oil pre-polymer isocyanates and soy polyol pre-polymer isocyanates). An example of a useful diisocyanate is methylene diphenyl diisocyanate (MDI). Useful MDI's include MDI monomers, MDI oligomers, and mixtures thereof.

Further examples of useful isocyanates include those having NCO (i.e., the reactive group of an isocyanate) contents ranging from about 25% to about 35% by weight. Examples of useful isocyanates are found, for example, in *Polyurethane Handbook: Chemistry, Raw Materials, Processing Application, Properties*, 2$^{nd}$ Edition, Ed: Gunter Oertel; Hanser/Gardner Publications, Inc., Cincinnati, Ohio, which is herein incorporated by reference. Suitable examples of aromatic polyisocyanates include 2,4- or 2,6-toluene diisocyanate, including mixtures thereof; p-phenylene diisocyanate; tetramethylene and hexamethylene diisocyanates; 4,4-dicyclohexylmethane diisocyanate; isophorone diisocyanate; 4,4-phenylmethane diisocyanate; polymethylene polyphenylisocyanate; and mixtures thereof. In addition, triisocyanates may be used, for example, 4,4,4-triphenylmethane triisocyanate; 1,2,4-benzene triisocyanate; polymethylene polyphenyl polyisocyanate; methylene polyphenyl polyisocyanate; and mixtures thereof. Suitable blocked isocyanates are formed by the treatment of the isocyanates described herein with a blocking agent (e.g., diethyl malonate, 3,5-dimethylpyrazole, methylethylketoxime, and caprolactam). Isocyanates are commercially available, for example, from Bayer Corporation (Pittsburgh, Pa.) under the trademarks MONDUR and DESMODUR. Other examples of suitable isocyanates include MONDUR MR Light (Bayer Corporation; Pittsburgh, Pa.), PAPI 27 (Dow Chemical Company; Midland, Mich.), Lupranate M20 (BASF Corporation; Florham Park, N.J.), Lupranate M70L (BASF Corporation; Florham Park, N.J.), Rubinate M (Huntsman Polyurethanes; Geismar, La.), Econate 31 (Ecopur Industries), and derivatives thereof.

The average functionality of isocyanates useful with the composites described herein is between about 1.5 to about 5. Further, examples of useful isocyanates include isocyanates with an average functionality of about 2 to about 4.5, about 2.2 to about 4, about 2.4 to about 3.7, about 2.6 to about 3.4, and about 2.8 to about 3.2.

The at least one polyol for use in the polyurethane composite can include polyester polyols, polyether polyols, or combinations thereof. In some embodiments, the at least one polyol can include 50% or more of one or more highly reactive (i.e., first) polyols. For example, the at least one polyol can include greater than 55%, greater than 60%, greater than 65%, greater than 70%, greater than 75%, greater than 80%, greater than 85%, greater than 90%, greater than 95%, or 100% of one or more highly reactive polyols.

In some embodiments, the one or more highly reactive polyols can include polyols having a hydroxyl number of greater than 250. For example, the hydroxyl number can be greater than 275, greater than 300, greater than 325, greater than 350, greater than 375, greater than 400, greater than 425, greater than 450, greater than 475, greater than 500, greater than 525, greater than 550, greater than 575, greater than 600, greater than 625, greater than 650, greater than 675, greater than 700, greater than 725, or greater than 750.

In some embodiments, the one or more highly reactive polyols can include polyols having a primary hydroxyl number of greater than 250. As used herein, the primary hydroxyl number is defined as the hydroxyl number multiplied by the percentage of primary hydroxyl groups based on the total number of hydroxyl groups in the polyol. For example, the primary hydroxyl number can be greater than 255, greater than 260, greater than 265, greater than 270, greater than 275, greater than 280, greater than 285, greater than 290, or greater than 295.

In some embodiments, the one or more highly reactive polyols include a large number of primary hydroxyl groups (e.g., 75% or more) based on the total number of hydroxyl groups in the polyol. For example, the highly reactive polyols can include 80% or more, 85% or more, 90% or more, 95% or more, or 100% of primary hydroxyl groups. The number of primary hydroxyl groups can be determined using fluorine NMR spectroscopy as described in ASTM D4273, which is hereby incorporated by reference in its entirety.

In some embodiments, the one or more highly reactive polyols can include a Mannich polyol. Mannich polyols are the condensation product of a substituted or unsubstituted phenol, an alkanolamine, and formaldehyde. Mannich polyols can be prepared using methods known in the art. For example, Mannich polyols can be prepared by premixing the phenolic compound with a desired amount of the alkanolamine, and then slowly adding formaldehyde to the mixture at a temperature below the temperature of Novolak formation. At the end of the reaction, water is stripped from the reaction mixture to provide a Mannich base. See, for example, U.S. Pat. No. 4,883,826, which is incorporated herein by reference in its entirety. The Mannich base can then be alkoxylated to provide a Mannich polyol.

The substituted or unsubstituted phenol can include one or more phenolic hydroxyl group. In certain embodiments, the substituted or unsubstituted phenol includes a single hydroxyl group bound to a carbon in an aromatic ring. The phenol can be substituted with substituents which do not undesirably react under the conditions of the Mannich condensation reaction, a subsequent alkoxylation reaction (if performed), or the preparation of polyurethanes from the final product. Examples of suitable substituents include alkyl (e.g., a $C_1$-$C_{18}$ alkyl, or a $C_1$-$C_{12}$ alkyl), aryl, alkoxy, phenoxy, halogen, and nitro groups.

Examples of suitable substituted or unsubstituted phenols that can be used to form Mannich polyols include phenol, o-, p-, or m-cresols, ethylphenol, nonylphenol, dodecylphenol, p-phenylphenol, various bisphenols including 2,2-bis(4-hydroxyphenyl)propane (bisphenol A), β-naphthol, β-hydroxyanthracene, p-chlorophenol, o-bromophenol, 2,6-dichlorophenol, p-nitrophenol, 4- or 2-nitro-6-phenylphenol, 2-nitro-6- or 4-methylphenol, 3,5-dimethylphenol, p-isopropylphenol, 2-bromo-6-cyclohexylphenol, and combinations thereof. In some embodiments, the Mannich polyol is derived from a phenol or a monoalkyl phenol (e.g., a para-alkyl phenol). In some embodiments, the Mannich polyol is derived from a substituted or unsubstituted phenol selected from the group consisting of phenol, para-n-nonylphenol, and combinations thereof.

The alkanolamine used to produce the Mannich polyol can include a monoalkanolamine, a dialkanolamine, or combinations thereof. Examples of suitable monoalkanolamines include methylethanolamine, ethylethanolamine, methylisopropanolamine, ethylisopropanolamine, methyl-2-hydroxybutylamine, phenylethanolamine, ethanolamine, isopropanolamine, and combinations thereof. Exemplary dialkanolamines include diisopropanolamine, ethanolisopropanolamine, ethanol-2-hydroxybutylamine, isopropanol-2-hydroxybutylamine, isopropanol-2-hydroxyhexylamine, ethanol-2-hydroxyhexylamine, and combinations thereof. In certain embodiments, the alkanolamine is selected from the group consisting of diethanolamine, diisopropanolamine, and combinations thereof.

Any suitable alkylene oxide or combination of alkylene oxides can be used to form the Mannich polyol. In some embodiments, the alkylene oxide is selected from the group consisting of ethylene oxide, propylene oxide, butylene oxide, and combinations thereof. In certain embodiments, the Mannich polyol is alkoxylated with from 100% to about 80% propylene oxide and from 0 to about 20 wt. % ethylene oxide.

Mannich polyols are known in the art, and include, for example, ethylene and propylene oxide-capped Mannich polyols sold under the trade names CARPOL® MX-425 and CARPOL® MX-470 (Carpenter Co., Richmond, Va.).

In some embodiments, the one or more first polyols can include an aromatic polyester, an aromatic polyether polyol, or a combination thereof. In some embodiments, the one or more first polyols include an aromatic polyester polyol such as those sold under the TEROL® trademark (e.g., TEROL® 198).

Examples of highly reactive polyols also include Pel-Soy 744 and Pel-Soy P-750, soybean oil based polyols commercially available from Pelron Corporation; Agrol Diamond, a soybean oil based polyol commercially available from BioBased Technologies; Ecopol 122, Ecopol 131 and Ecopol 132, soybean oil polyols formed using polyethylene terephthalate and commercially available from Ecopur Industries; Stepanpol PD-110 LV and PS 2352, polyols based on soybean oil, diethylene glycol and phthallic anhydride and commercially available from Stepan Company; Voranol 280, 360 and WR2000, polyether polyols commercially available from Dow Chemical Company; Honey Bee HB-530, a soybean oil-based polyol commercially available from MCPU Polymer Engineering; Renewpol, commercially available from Styrotech Industries (Brooklyn Park, Minn.); JeffAdd B 650, a 65% bio-based content (using ASTM D6866-06) additive based on soybean oil commercially available from Huntsman Polyurethanes; Jeffol SG 360, a sucrose and glycerin-based polyol commercially available from Huntsman Polyurethanes; and derivatives thereof. For example, Ecopol 131 is a highly reactive aromatic polyester polyol comprising 80% primary hydroxyl groups, a hydroxyl number of 360-380 mg KOH/g, i.e., and a primary hydroxyl number of 288-304 mg KOH/g.

The at least one polyol for use in the polyurethane composites can include one or more plant-based polyols or non plant-based polyols. In some embodiments, the plant-based polyols are highly reactive polyols. The one or more plant-based polyols useful in the polyurethane composites can include polyols containing ester groups that are derived from plant-based fats and oils. Accordingly, the one or more plant-based polyols can contain structural elements of fatty acids and fatty alcohols. Starting materials for the plant-based polyols of the polyurethane component can include fats and/or oils of plant-based origin with preferably unsaturated fatty acid residues. The one or more plant-based polyols useful with the polyurethane composites include, for example, castor oil, coconut oil, corn oil, cottonseed oil, lesquerella oil, linseed oil, olive oil, palm oil, palm kernel oil, peanut oil, sunflower oil, tall oil, and mixtures thereof.

In some embodiments, the one or more polyols include a less reactive polyol. For example, the polyurethane composite can be produced from one or more less reactive polyols in addition to one or more highly reactive polyols. Less reactive polyols can have lower hydroxyl numbers, lower numbers of primary hydroxyl groups and/or lower primary hydroxyl numbers than the highly reactive polyols. In some embodiments, the less reactive polyols can have hydroxyl numbers of less than 250, less than 225, less than 200, less than 175, less than 150, less than 125, less than 100, less than 80, less than 60, less than 40, or even less than 20. In some embodiments, the less reactive polyols have about 50% or less primary hydroxyl groups, about 40% or less primary hydroxyl groups, about 30% or less primary hydroxyl groups, about 20% or less primary hydroxyl groups, or even about 10% or less primary hydroxyl groups. In some embodiments, the less reactive polyols can have primary hydroxyl numbers of less than about 220, less than about 200, less than about 180, less than about 160, less than about 140, less than about 120, less than about 100, less than about 80, less than about 60, less than about 40, or even less than about 20. Suitable less reactive polyols include castor oil; Stepanpol PS-2052A (commercially available from the Stepan Company); Agrol 2.0, 3.6, 4.3, 5.6 and 7.0 (plant-based polyols commercially available from BioBased Technologies); Ecopol 123 and Ecopol 124, which are commercially available from Ecopur Industries; Honey Bee HB-150 and HB-230, soybean oil-based polyols commercially available from MCPU Polymer Engineering; Terol 1154, commercially available from Oxid (Houston, Tex.); Multranol 3900, Multranol 3901, Arcol 11-34, Arcol 24-32, Arcol 31-28, Arcol E-351, Arcol LHT-42, and Arcol LHT-112, commercially available from Bayer; and Voranol 220-028, 220-094, 220-110N, 222-056, 232-027, 232-034, and 232-035, commercially available from Dow.

The at least one polyol can include 50% or less of one or more less reactive polyols in addition to the one or more highly reactive polyols. For example, the at least one polyol can include less than 45%, less than 40%, less than 35%, less than 30%, less than 25%, less than 20%, less than 15%, less than 10%, or less than 5%, of one or more less reactive polyols.

The at least one polyol for use in the disclosure can have an average functionality of 1.5 to 8.0, 1.6 to 6.0, 1.8 to 4.0, 2.5 to 3.5, or 2.6 to 3.1. The average hydroxyl number values (as measured in units of mg KOH/g) for the at least one polyol can be from about 100 to 600, 150 to 550, 200 to 500, 250 to 440, 300 to 415, and 340 to 400.

The polyurethane composites can include more than one type of polyol. The one or more polyols can be combined in various percentages, e.g., 15-40% of a less reactive polyol and 60-85% of a highly reactive polyol.

The polyurethane systems used to form the composite materials described herein can include one or more additional isocyanate-reactive monomers in addition to the at least one polyol. The one or more additional isocyanate-reactive monomers can include, for example, amine and optionally hydroxyl groups.

In some embodiments, the one or more additional isocyanate-reactive monomers can include a polyamine. The first isocyanate-reactive monomer can comprise a polyamine Any suitable polyamine can be used. Suitable polyamines can correspond to the polyols described herein (for example, a polyester polyol or a polyether polyol), with the exception that the terminal hydroxy groups are converted to amino groups, for example by amination or by reacting the hydroxy groups with a diisocyanate and subsequently hydrolyzing the terminal isocyanate group to an amino group. By way of example, the polyamine can be polyether polyamine, such as polyoxyalkylene diamine or polyoxyalkylene triamine. Polyether polyamines are known in the art, and can be prepared by methods including those described in U.S. Pat. No. 3,236,895 to Lee and Winfrey. Exemplary polyoxyalkylene diamines are commercially available, for example, from Huntsman Corporation under the trade names Jeffamine® D-230, Jeffamine® D-400 and Jeffamine® D-2000. Exemplary polyoxyalkylene triamines are commercially available, for example, from Huntsman Corporation under the trade names Jeffamine® T-403, Jeffamine® T-3000, and Jeffamine® T-5000.

In some embodiments, the additional isocyanate-reactive monomer can include an alkanolamine. The alkanolamine can be a dialkanolamine, a trialkanolamine, or a combination thereof. Suitable dialkanolamines include dialkanolamines which include two hydroxy-substituted $C_1$-$C_{12}$ alkyl groups (e.g., two hydroxy-substituted $C_1$-$C_8$ alkyl groups, or two hydroxy-substituted $C_1$-$C_6$ alkyl groups). The two hydroxy-substituted alkyl groups can be branched or linear, and can be of identical or different chemical composition. Examples of suitable dialkanolamines include diethanolamine, diisopropanolamine, ethanolisopropanolamine, ethanol-2-hydroxybutylamine, isopropanol-2-hydroxybutylamine, isopropanol-2-hydroxyhexylamine, ethanol-2-hydroxyhexylamine, and combinations thereof. Suitable trialkanolamines include trialkanolamines which include three hydroxy-substituted $C_1$-$C_{12}$ alkyl groups (e.g., three hydroxy-substituted $C_1$-$C_8$ alkyl groups, or three hydroxy-substituted $C_1$-$C_6$ alkyl groups). The three hydroxy-substituted alkyl groups can be branched or linear, and can be of identical or different chemical composition. Examples of suitable trialkanolamines include triisopropanolamine (TIPA), triethanolamine, N,N-bis(2-hydroxyethyl)-N-(2-hydroxypropyl)amine (DEIPA), N,N-bis(2-hydroxypropyl)-N-(hydroxyethyl)amine (EDIPA), tris(2-hydroxybutyl)amine, hydroxyethyl di(hydroxypropyl)amine, hydroxypropyl di(hydroxyethyl)amine, tri(hydroxypropyl)amine, hydroxyethyl di(hydroxy-n-butyl)amine, hydroxybutyl di(hydroxypropyl)amine, and combinations thereof.

In some embodiments, the additional isocyanate-reactive monomer can comprise an adduct of an alkanolamine described above with an alkylene oxide. The resulting amine-containing polyols can be referred to as alkylene oxide-capped alkanolamines Alkylene oxide-capped alkanolamines can be formed by reacting a suitable alkanolamine with a desired number of moles of an alkylene oxide. Any suitable alkylene oxide or combination of alkylene oxides can be used to cap the alkanolamine. In some embodiments, the alkylene oxide is selected from the group consisting of ethylene oxide, propylene oxide, butylene oxide, and combinations thereof. Alkylene oxide-capped alkanolamines are known in the art, and include, for example, propylene oxide-capped triethanolamine sold under the trade names CARPOL® TEAP-265 and CARPOL® TEAP-335 (Carpenter Co., Richmond, Va.).

In some embodiments, the additional isocyanate-reactive monomer can include an alkoxylated polyamine (i.e., alkylene oxide-capped polyamines) derived from a polyamine and an alkylene oxide. Alkoxylated polyamine can be formed by reacting a suitable polyamine with a desired number of moles of an alkylene oxide. Suitable polyamines include monomeric, oligomeric, and polymeric polyamines. In some cases, the polyamines has a molecular weight of less than 1000 g/mol (e.g., less than 800 g/mol, less than 750 g/mol, less than 500 g/mol, less than 250 g/mol, or less than 200 less than 200 g/mol). Examples of suitable polyamines that can be used to form alkoxylated polyamines include ethylenediamine, 1,3-diaminopropane, putrescine, cadaverine, hexamethylenediamine, 1,2-diaminopropane, o-phenylenediamine, m-phenylenediamine, p-phenylenediamine, spermidine, spermine, norspermidine, toluene diamine, 1,2-propane-diamine, diethylenetriamine, triethylenetetramine, tetraethylene-pentamine (TEPA), pentaethylenehexamine (PEHA), and combinations thereof.

Any suitable alkylene oxide or combination of alkylene oxides can be used to cap the polyamine. In some embodiments, the alkylene oxide is selected from the group consisting of ethylene oxide, propylene oxide, butylene oxide, and combinations thereof. Alkylene oxide-capped polyamines are known in the art, and include, for example, propylene oxide-capped ethylene diamine sold under the trade name CARPOL® EDAP-770 (Carpenter Co., Richmond, Va.) and ethylene and propylene oxide-capped ethylene diamine sold under the trade name CARPOL® EDAP-800 (Carpenter Co., Richmond, Va.).

The additional isocyanate-reactive monomer (when used) can be present in varying amounts relative the at least one polyol used to form the polyurethane. In some embodiments, the additional isocyanate-reactive monomer can be present in an amount of 30% or less, 25% or less, 20% or less, 15% or less, 10% or less, or 5% or less by weight based on the weight of the at least one polyol.

As indicated herein, in the polyurethane composites, an isocyanate is reacted with a polyol (and any additional isocyanate-reactive monomers) to produce the polyurethane formulation. In general, the ratio of isocyanate groups to the total isocyanate reactive groups, such as hydroxyl groups, water and amine groups, is in the range of about 0.5:1 to about 1.5:1, which when multiplied by 100 produces an isocyanate index between 50 and 150. Additionally, the isocyanate index can be from about 80 to about 120, from about 90 to about 120, from about 100 to about 115, or from about 105 to about 110. As used herein, an isocyanate may be selected to provide a reduced isocyanate index, which can be reduced without compromising the chemical or mechanical properties of the composite material.

One or more catalysts can be added to facilitate curing and can be used to control the curing time of the polyurethane matrix. Examples of useful catalysts include amine-containing catalysts (such as DABCO, tetramethylbutanediamine, and diethanolamine) and tin-, mercury-, and bismuth-containing catalysts. In some embodiments, 0.01 wt % to 2 wt % catalyst or catalyst system (e.g., 0.025 wt % to 1 wt %, 0.05 wt % to 0.5 wt %, or 0.1 wt % to about 0.25 wt %) can be used.

The polymer can be present in the polymeric composite in amounts from 10% to 60% based on the weight of polymeric composite. For example, the polymer can be included in an amount of 15% to 55% or 20% to 50% by weight, based on the weight of the polymer composite. In some embodiments, the polymer in the polymeric composites can be present in an amount of 10% or greater, 15% or greater, 20% or greater, 25% or greater, 30% or greater, 35% or greater, 40% or greater, 45% or greater, 50% or greater, or 55% or greater by weight, based on the weight of polymeric composite. In some embodiments, the polymer in the polymeric composites can be present in an amount of 60% or less, 55% or less, 50% or less, 45% or less, 40% or less, 35% or less, 30% or less, 25% or less, 20% or less, or 15% or less by weight, based on the weight of polymeric composite.

As described herein, the polymeric composites include a polymer, an inorganic filler, and a plurality of short length fibers. The inorganic filler can be an ash, ground/recycled glass (e.g., window or bottle glass); milled glass; glass spheres; glass flakes; activated carbon; calcium carbonate; aluminum trihydrate (ATH); silica; sand; ground sand; silica fume; slate dust; crusher fines; red mud; amorphous carbon (e.g., carbon black); clays (e.g., kaolin); mica; talc; wollastonite; alumina; feldspar; bentonite; quartz; garnet; saponite; beidellite; granite; calcium oxide; calcium hydroxide; antimony trioxide; barium sulfate; magnesium oxide; titanium dioxide; zinc carbonate; zinc oxide; nepheline syenite; perlite; diatomite; pyrophillite; flue gas desulfurization (FGD) material; soda ash; trona; and mixtures thereof. The ash can be a coal ash or another type of ash such as those produced by firing fuels including industrial gases, petroleum coke, petroleum products, municipal solid waste, paper sludge, wood, sawdust, refuse derived fuels, switchgrass or other biomass material. The coal ash can be fly ash, bottom ash, or combinations thereof. In some examples, the inorganic filler used is fly ash. Fly ash is produced from the combustion of pulverized coal in electrical power generating plants. The fly ash useful with the composite materials described herein can be Class C fly ash, Class F fly ash, or a mixture thereof. Fly ash produced by coal-fueled power plants is suitable for incorporation in the composites described herein.

In some embodiments, the inorganic filler present in the polymeric composites can include sand. The sand can be present in the composites in amounts from 0.1% to 5% by weight. In some embodiments, the inorganic filler can include fly ash and sand.

The inorganic filler can be present in the polymeric composites described herein in amounts from 25% to 90% by weight. In some embodiments, the inorganic filler can be present in amounts from 40% to 85%, 45% to 85%, 50% to 85%, 55% to 85%, 60% to 85%, or 60% to 80% by weight.

Examples of the amount of inorganic filler present in the composites described herein include 25%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, or 90%.

In addition to an inorganic filler, the composite can include an organic filler, such as a recycled polymeric material. Suitable examples include pulverized polymeric foam or recycled rubber material The inclusion of fillers in the polyurethane composite as described herein can modify and/or improve the chemical and mechanical properties of the composite. For example, the optimization of various properties of the composite allows their use in building materials and other structural applications.

The polymeric composites can also include a plurality of short length fibers. The short length fibers can be any natural or synthetic fiber material, based on inorganic materials, organic materials, or combinations of both. Exemplary inorganic short length fibers that can be used in the polymeric composite include mineral wool fibers such as stone wool, slag wool, or ceramic fiber wool. The mineral wool fibers can be synthetic or can be obtained from molten mineral such as lava, rock or stone. Other suitable inorganic short length fibers include basalt fibers, wollastonite fibers, alumina silica fibers, aluminum oxide fibers, silica fibers, carbon fibers, metal fibers, and combinations thereof. Exemplary organic short length fibers that can be used in the polymeric composite include hemp fibers, sisal fibers, cotton fibers, straw, reeds, or other grasses, jute, bagasse fibers, abaca fibers, flax, southern pine fibers, wood fibers, cellulose, lint, vicose, leather fibers, and mixtures thereof. Other suitable organic short length fibers include synthetic fibers such as, Kevlar, viscose fibers, polyamide fibers, polyacrylonitrile fibers, Dralon® fibers, polyethylene fibers, polypropylene fibers, polyvinylalcohol fibers, aramid fibers, carbon fibers, or combinations thereof. In some embodiments, the polymeric composites can include a combination of fibers that break and fibers that do not break when the composite is fractured by external stress.

The short length fibers in the polymeric composites can be from 50 µm to 650 µm in average (mean) length (i.e., can have an average length of from 50 µm to 650 µm). For example, the short length fibers can have an average length of 50 µm or greater, 60 µm or greater, 70 µm or greater, 80 µm or greater, 90 µm or greater, 100 µm or greater, 110 µm or greater, 120 µm or greater, 130 µm or greater, 140 µm or greater, 150 µm or greater, 160 µm or greater, 170 µm or greater, 180 µm or greater, 190 µm or greater, 200 µm or greater, 220 µm or greater, 240 µm or greater, 260 µm or greater, 280 µm or greater, 300 µm or greater, 320 µm or greater, or 350 µm or greater. In some embodiments, the short length fibers can have an average length of 650 µm or less, 600 µm or less, 550 µm or less, 500 µm or less, 450 µm or less, 400 µm or less, 350 µm or less, 300 µm or less, 290 µm or less, 280 µm or less, 270 µm or less, 260 µm or less, 250 µm or less, 240 µm or less, 230 µm or less, 220 µm or less, 210 µm or less, 200 µm or less, 190 µm or less, 180 µm or less, 170 µm or less, 160 µm or less, 150 µm or less, 140 µm or less, 130 µm or less, 120 µm or less, 110 µm or less, 100 µm or less, 90 µm or less, 80 µm or less, 70 µm or less, 60 µm or less, or 50 µm or less. In some examples, the short length fibers in the polymeric composites can have an average length of from 50 µm to 650 µm, 75 µm to 650 µm, 100 µm to 500 µm, 50 µm to 350 µm, or 100 µm or 250 µm. In some embodiments, the lengths of the short length fibers in the composite can be uniform (the lengths of all the fibers can be within 10% of the average length). In some embodiments, the lengths of the short length fibers in the composite can vary. For example, the fiber lengths can fall into two modes having an average length within the disclosed range. In some embodiments, all the short length fibers have a length of from 50 µm to 650 µm, from 50 µm to 500 µm, from 50 µm to 350 µm, or from 100 µm or 250 µm.

The short length fibers in the polymeric composites can have an average diameter of from 1 µm to 20 µm. For example, the short length fibers can be from 2 µm to 20 µm, 3 µm to 20 µm, 4 µm to 20 µm, 5 µm to 20 µm, 2 µm to 18 mµm, 3 µm to 18 µm, 4 µm to 18 µm, 5 µm to 18 µm, 2 µm to 15 µm, 3 µm to 15 µm, 4 µm to 15 µm, or 5 µm to 15 µm in average diameter. In some embodiments, the average diameter of the short length fibers can be 3 µm, 3.5 µm, 4 µm, 4.5 µm, 5 µm, 5.5 µm, 6 µm, 6.5 µm, 7 µm, 7.5 µm, 8 µm, 8.5 µm, 9 µm, 9.5 µm, or 10 µm. The diameter of the short length fibers in the composite can be uniform or varied.

The short length fibers can also be described by their aspect ratio. In some embodiments, the short length fibers in the polymeric composites can have an average aspect ratio of length to diameter of from 5:1 to 250:1. For example, the short length fibers can have an average aspect ratio of from 8:1 to 250:1, 10:1 to 250:1, 10:1 to 200:1, 10:1 to 150:1, 10:1 to 100:1, 10:1 to 75:1, 10:1 to 50:1, 10:1 to 40:1, or 10:1 to 30:1. In some embodiments, the short length fibers can have an average aspect ratio of length to diameter of from 10:1 or greater, 15:1 or greater, 20:1 or greater, 25:1 or greater, 30:1 or greater, or 40:1 or greater. In some embodiments, the short length fibers can have an average aspect ratio of length to diameter of from 200:1 or less, 150:1 or less, 100:1 or less, 75:1 or less, 50:1 or less, or 40:1 or less.

The short length fibers can be present in the polymeric composite in any suitable amount to confer a desirable property to the polymeric composite. The short length fibers can be present in the polymeric composites in amounts from 0.5% to 15% by weight, based on the total weight of the composite. For example, the short length fibers can be in amounts from 1% to 10%, 2% to 9%, or 3% to 8% by weight, based on the total weight of the composite. In some embodiments, the short length fibers can be present in the polymeric composites in amounts of 1% or greater, 2% or greater, 3% or greater, 4% or greater, 5% or greater, 6% or greater, 7% or greater, 8% or greater, 9% or greater, or 10% or greater, by weight, based on the total weight of the composite. In some embodiments, the short length fibers can be present in the polymeric composites in amounts of 15% or less, 12% or less, 10% or less, 9% or less, 8% or less, 7% or less, 6% or less, or 5% or less by weight, based on the total weight of the composite. In some embodiments, the short length fibers are present in the polymeric composites in an effective amount to increase the flexural strength and/or compressive strength of the composite, compared to a composite without the same.

In some embodiments, the fibers can be coated with a composition to modify the reactivity of the fibers. For example, the fibers can be coated with a sizing agent such as a coupling agent (compatibilizer). In some embodiments, the short length fibers can be coated with a composition for promoting adhesion. U.S. Pat. No. 5,064,876 to Hamada et al. and U.S. Pat. No. 5,082,738 to Swofford, for example, disclose compositions for promoting adhesion. In some embodiments, the short length fibers are surface coated with a composition comprising a silane compound such as aminosilane. U.S. Pat. No. 4,062,999 to Kondo et al. and U.S. Pat. No. 6,602,379 to Li et al. describe suitable aminosilane compounds for coating fibers. In some embodiments, the polymeric composites can include a combination of coated and uncoated fibers.

Incorporation of the short length fibers in the polymeric composites can confer advantageous properties such as increased flexural strength, increased compressive strength, low thermal conductivity, decreased density, and/or decreased viscosity, compared to a polymeric composite without the same. The advantageous properties conferred by the short length fibers can be selected based on the concentration and/or the length of the short length fibers in the composite. For example, the orientation of the short length fibers in the polymeric composites may be characterized as being isotropic in nature, that is, the fiber orientation occurs in three dimensions rather than being limited essentially to a planar dispersion. Said another way, referencing the orthogonal axes of a Cartesian coordinate system in which the x and y axes define the laminar dimensions of the composite and the z axis the cross laminar dimension, the short length fibers can exhibit substantial orientation along both the x-y axes and the z-axis. Thus, for thin articles, such as for example, an article about 6 mm thick, the short length fibers are capable of reinforcing the article along the z-direction as well as in the x-y plane.

The polymeric composites can further comprise glass fibers. "Glass fibers" as used herein, refers to fibrous glass derived from a combination of minerals, recycled materials, and virgin materials such as sand, soda ash, and lime. Glass fibers can include fibrous glass such as E-glass, C-glass, S-glass, and AR-glass fibers. The glass fibers can be from 1 mm to 50 mm in average length. In some examples, the glass fibers are from 1 mm to 20 mm, from 2 mm to 20 mm, from 3 mm to 20 mm, or from 3 mm to 15 mm in average length. In some examples, the average length of the glass fibers in the polymeric composites can be 1 mm or greater, 1.5 mm or greater, 2 mm or greater, 3 mm or greater, 4 mm or greater, 5 mm or greater, or 6 mm or greater. In some embodiments, the average length of the glass fibers can be 50 mm or less, 40 mm or less, 30 mm or less, 20 mm or less, 15 mm or less, 12 mm or less, or 10 mm or less. The glass fibers can be provided in a random orientation or can be axially oriented. The glass fibers can be coated with a sizing agent to modify their reactivity.

The glass fibers in the polymeric composites can have any dimension of from 1 µm to 30 µm in average diameter. For example, the average diameter of the glass fibers can be 2 µm to 25 µm, 3 µm to 20 µm, 4 µm to 18 µm, or 5 µm to 15 µm in average diameter. In some examples, the average diameter of the glass fibers in the polymeric composites can be 1 mm or greater, 3 mm or greater, 5 mm or greater, 6 mm or greater, 7 mm or greater, 8 mm or greater, 9 mm or greater, or 10 mm or greater. In some embodiments, the glass fibers in the polymeric composites can have a narrow distribution of diameters. For example, the glass can have a distribution wherein 95% or more of the fibers have a diameter that is within 10% of the average diameter.

The glass fibers (when used) can be present in the polymeric composites in amounts from 0.5% to 10% by weight, based on the weight of polymeric composite. For example, the glass fibers can be present in amounts from 1% to 9%, 2% to 8%, 2.5% to 7.5%, or 3% to 7% by weight, based on the weight of the polymeric composite.

The glass fibers can provide increased strength, stiffness or toughness to the polymeric composites. In some examples, fire resistant or retardant glass fibers can be included to impart fire resistance or retarding properties to the polymeric composites.

Additional components useful with the composite materials include foaming agents, blowing agents, surfactants, chain-extenders, crosslinkers, coupling agents, UV stabilizers, fire retardants, antimicrobials, anti-oxidants, and pigments. Though the use of such components is well known to those of skill in the art, some of these additional additives are further described herein.

Chemical foaming agents include azodicarbonamides (e.g., Celogen manufactured by Lion Copolymer Geismar); and other materials that react at the reaction temperature to form gases such as carbon dioxide. Water is an exemplary foaming agent. In some embodiments, water may be present in the mixture in an amount of from greater than 0% to 5% by weight or less, based on the weight of the mixture. In some embodiments, water may be present in the mixture in an amount of from 0.02%, 0.03%, 0.04%, 0.05%, 0.10%, 0.15%, 0.2%, 0.25%, 0.3%, 0.4%, 0.5%, 0.6%, 0.7%, 0.8%, 0.9%, 1%, 1.2%, 1.5%, or 1.6%, 1.7%, 1.8%, 1.9%, or 2%, by weight, based on the weight of the mixture. For example, the water can be present in a range of 0.02% to 4%, 0.05% to 3%, 0.1% to 2%, or 0.2% to 1% by weight, based on the weight of the mixture. In some embodiments, the water is present from 0.04% to 2% or from 0.02% to 0.5% by weight, based on the weight of the mixture.

Surfactants can be used as wetting agents and to assist in mixing and dispersing the materials in the composite. Surfactants can be used, for example, in amounts below about 0.5 wt % based on the total weight of the mixture. Examples of surfactants useful with the polymers described herein include anionic, non-ionic and cationic surfactants. For example, silicone surfactants such as DC-197 and DC-193 (Air Products; Allentown, Pa.) can be used. Coupling agents and other surface treatments such as viscosity reducers, flow control agents, or dispersing agents can be added directly to the filler or short length fibers, or incorporated prior to, during, and/or after the mixing and reaction of the composite materials. Coupling agents can allow higher filler loadings of an inorganic filler such as fly ash and may be used in small quantities. For example, the composite may comprise about 0.01 wt % to about 0.5 wt % of a coupling agent. Examples of coupling agents useful with the composite materials described herein include Ken-React LICA 38 and KEN-React KR 55 (Kenrich Petrochemicals; Bayonne, N.J.). Examples of dispersing agents useful with the composite materials described herein include JEFFSPERSE X3202, JEFFSPERSE X3202RF, and JEFFSPERSE X3204 (Huntsman Polyurethanes; Geismar, La.).

Ultraviolet light stabilizers, such as UV absorbers, can be added to the composite. Examples of UV light stabilizers include hindered amine type stabilizers and opaque pigments like carbon black powder. Fire retardants can be included to increase the flame or fire resistance of the composite material. Antimicrobials can be used to limit the growth of mildew and other organisms on the surface of the composite. Antioxidants, such as phenolic antioxidants, can also be added. Antioxidants provide increased UV protection, as well as thermal oxidation protection. Pigments or dyes can optionally be added to the composite materials described herein. An example of a pigment is iron oxide, which can be added in amounts ranging from about 2 wt % to about 7 wt %, based on the total weight of the composite material.

The polymeric composite can be produced by mixing the polymer, the inorganic filler, and the plurality of short length fibers, in a mixing apparatus such as a high speed mixer or an extruder. In some embodiments, mixing can be conducted in an extruder. The materials can be added in any suitable order. For example, in some embodiments, the mixing stage of the method used to prepare the polymeric composite includes: (1) mixing the short length fibers with the inorganic filler and the polymer, and (2) mixing the inorganic filler with the polymer and short length fibers. As discussed herein, in some embodiments, the polymer is a polyurethane formed by a reaction of at least one isocyanate and at least one polyol, optionally in the presence of a catalyst. Thus, in some embodiments, the mixing stage of the method used to prepare the polyurethane composite includes: (1) mixing the polyol, short length fibers, and inorganic filler; (2) mixing the isocyanate with the polyol, short length fibers, and the inorganic filler; and optionally (3) mixing the catalyst with the isocyanate, the polyol, the short length fibers, and the inorganic filler.

An ultrasonic device can be used for enhanced mixing and/or wetting of the various components of the composite. The ultrasonic device produces an ultrasound of a certain frequency that can be varied during the mixing and/or extrusion process. The ultrasonic device useful in the preparation of composite materials described herein can be attached to or adjacent to an extruder and/or mixer. For example, the ultrasonic device can be attached to a die or nozzle or to the port of an extruder or mixer. An ultrasonic device may provide de-aeration of undesired gas bubbles and better mixing for the other components, such as blowing agents, surfactants, and catalysts.

The mixture can then be extruded into a mold cavity of a mold, the mold cavity formed by at least an interior mold surface. The mold can be a continuous forming system such as a belt molding system or can include individual batch molds. The belt molding system can include a mold cavity formed at least in part by opposing surfaces of two opposed belts. A molded article can then be formed followed by removal of the article from the mold.

The polymer may be processed at an elevated temperature (e.g., 200-500 F.) to form a melt and to allow the polymer to have a workable viscosity. In some embodiments, the inorganic filler is heated before mixing with the polymer. The molten filled polymer (that is, the polymer, the inorganic filler, and the short length fibers) can have a workable viscosity of 25 Pa·s as to 250 Pa·s. Incorporation of the short length fibers into the filled polymer mixture can increase the viscosity of the mixture. In some embodiments, it is desirable that the composite mixture has a viscosity below a particular threshold at the desired loadings so it can be effectively processed. In some embodiments, the short length fibers can be present in the composite mixture in amounts to produce a workable viscosity of from 25 Pa·s to 250 Pa·s. For example, the short length fiber in the composite mixture can be in amounts to produce a workable viscosity from 50 Pa·s to 250 Pa·s, 65 Pa·s to 250 Pa·s, or 80 Pa·s to 250 Pa·s. In some embodiments, the working viscosity can be less than 250 Pa·s, less than 225 Pa·s, less than 200 Pa·s, less than 175 Pa·s, or less than 150 Pa·s. The viscosity of the composite mixture can be measured using a Thermo Electron Corporation Haake Viscometer.

The polymeric composites preferably have a sufficiently high flexural strength. Incorporation of the short length fibers in the polymeric composites can increase the flexural strength of the composite by at least 8%, compared to a composite without short length fibers. In some embodiments, the flexural strength of the polymeric composites is at least 10%, for example, 15% or greater, 20% or greater, 25% or greater, 30% or greater, 35% or greater, 50% or greater, 75% or greater, or even 100% or greater, compared to a composite without short length fibers.

The polymeric composites can be formed into shaped articles and used in various applications including building materials. Examples of such building materials include siding material, roof coatings, roof tiles, roofing material, carpet backing, flexible or rigid foams such as automotive foams (e.g., for dashboard, seats or roofing), component coating, and other shaped articles. Examples of shaped articles made using composite described herein include roofing material such as roof tile shingles; siding material; trim boards; carpet backing; synthetic lumber; building panels; scaffolding; cast molded products; decking materials; fencing materials; marine lumber; doors; door parts; moldings; sills; stone; masonry; brick products; posts; signs; guard rails; retaining walls; park benches; tables; slats; and railroad ties. The composites described herein further can be used as reinforcement of composite structural members including building materials such as doors; windows; furniture; and cabinets and for well and concrete repair. The composites described herein also can be used to fill gaps, particularly to increase the strength of solid surface articles and/or structural components. The composites can be flexible, semi-rigid or rigid foams. In some embodiments, the flexible foam is reversibly deformable (i.e., resilient) and can include open cells. A 8"×1"×1" piece of a flexible foam can generally wrap around a 1" diameter mandrel at room temperature without rupture or fracture. Flexible foams also generally have a density of less than 5 lb/ft$^3$ (e.g., 1 to 5 lb/ft$^3$). In some embodiments, the rigid foam is irreversibly deformable and can be highly crosslinked and/or can include closed cells. Rigid foams generally have a density of 5 lb/ft$^3$ or greater (e.g., 5 to 60 lb/ft$^3$, 20 to 55 lb/ft$^3$, or 30 to 50 lb/ft$^3$). In some embodiments, the overall density of the molded article can be 5 lb/ft$^3$ or greater. For example, the overall density of the molded article can be 5 lb/ft$^3$ to 80 lb/ft$^3$, 10 lb/ft$^3$ to 70 lb/ft$^3$, 15 lb/ft$^3$ to 65 lb/ft$^3$, 20 lb/ft$^3$ to 60 lb/ft$^3$, 25 lb/ft$^3$ to 55 lb/ft$^3$, or 30 lb/ft$^3$ to 50 lb/ft$^3$.

EXPERIMENTAL

The following examples are put forth so as to provide those of ordinary skill in the art with a complete disclosure and description of how the composites, articles, and/or methods claimed herein are made and evaluated, and are intended to be purely exemplary of the composites disclosed herein. Unless indicated otherwise, parts are parts by weight, temperature is in ° C. or is at ambient temperature, and pressure is at or near atmospheric.

Analysis of the Flow Properties, Densities, and Flexural Strengths of Polyurethane Composites Polyurethane composites were prepared using six different fiber compositions (Table 1, samples 1-6). The compositions were mixed with a rotor operating at high rate of about 3000 rpm to impart high shear to the mixture. The flow properties, densities, and flexural strengths of the polyurethane composites are shown in Table 1.

Analysis of the Flow Properties and Viscosities of Polyurethane Composites

Polyurethane composites were prepared using nineteen different fiber compositions (Table 2, samples 7-25). Again, the compositions were mixed with a rotor operating at high rate of about 3000 rpm. The flow properties (under gravitation force) and viscosities of the polyurethane composites are shown in Table 2. The dimensions of the fibers are the same as described in Table 1.

TABLE 1

Effect of fiber composition on the physical properties of polyurethane composites

| | Sample ID | | | | | |
|---|---|---|---|---|---|---|
| | 1 | 2 | 3 | 4 | 5 | 6 |
| Polyurethane, wt % | 27.0 | 27.0 | 27.0 | 27.0 | 27.0 | 27.0 |
| Glass Fiber 3075, 3.175 mm length × 13 µm diameter, wt % | 0.0 | 2.0 | 4.0 | | | 2.0 |
| Mineral Wool PLM, 150 µm length × 6 µm diameter, wt % | | | | 4.0 | | 2.0 |
| Mineral Wool RF825, 150 µm length × 5.5 µm diameter, aminosilane coated, wt % | | | | | 4.0 | |
| Class C Fly Ash, Scherer, wt % | 73.0 | 71.0 | 69.0 | 69.0 | 69.0 | 69.0 |
| Flow Property | Flowable | Semi-flowable | Not flowable | Flowable | Flowable | Semi-flowable |
| Density, pcf | 48.6 | 48.0 | 48.6 | 48.5 | 47.7 | 48.2 |
| Flexural Strength, psi | 1919 | 2270 | 2190 | 2070 | 2610 | 2260 |
| % Increase in Flex Strength over Control Mix ID 1 | N/A | 18.3% | 14.1% | 7.8% | 36.0% | 17.8% |
| Normalized Flexural Strength, psi/pcf | 39 | 47 | 45 | 43 | 54.7 | 47 |
| % Increase in normalized Flex Strength over Mix ID 1 | N/A | 19.9% | 14.5% | 8.2% | 38.6% | 18.8% |

TABLE 2

Effect of fiber composition on the physical properties of polyurethane composites

| Mix ID | Poly MDI, wt % | Glass Fiber 3075, wt % | Mineral Wool PLM, wt % | Mineral Wool RF825, wt % | Class C Fly Ash, Scherer, wt % | Fiber Size, Length (µm) × Diameter (µm) | Viscosity[1] Pa · s | Flow Property |
|---|---|---|---|---|---|---|---|---|
| 7 | 27.0 | | | | 73.0 | N/A | 86.7 | Flowable |
| 8 | 27.0 | 1.0 | | | 72.0 | 150 × 6 | 90.4 | Flowable |
| 9 | 27.0 | 2.0 | | | 71.0 | 150 × 6 | 104.1 | Flowable |
| 10 | 27.0 | 3.0 | | | 70.0 | 150 × 6 | 123.4 | Flowable |

TABLE 2-continued

Effect of fiber composition on the physical properties of polyurethane composites

| Mix ID | Poly MDI, wt % | Glass Fiber 3075, wt % | Mineral Wool PLM, wt % | Mineral Wool RF825, wt % | Class C Fly Ash, Scherer, wt % | Fiber Size, Length (μm) × Diameter (μm) | Viscosity[1] Pa · s | Flow Property |
|---|---|---|---|---|---|---|---|---|
| 11 | 27.0 |  | 4.0 |  | 69.0 | 150 × 6 | 127.5 | Flowable |
| 12 | 27.0 |  | 5.0 |  | 68.0 | 150 × 6 | 158.4 | Flowable |
| 13 | 27.0 |  | 6.0 |  | 67.0 | 150 × 6 | 145.6 | Flowable |
| 14 | 27.0 |  |  | 1.0 | 72.0 | 150 × 5.5 | 99.7 | Flowable |
| 15 | 27.0 |  |  | 2.0 | 71.0 | 150 × 5.5 | 100.6 | Flowable |
| 16 | 27.0 |  |  | 3.0 | 70.0 | 150 × 5.5 | 105.9 | Flowable |
| 17 | 27.0 |  |  | 4.0 | 69.0 | 150 × 5.5 | 114.7 | Flowable |
| 18 | 27.0 |  |  | 5.0 | 68.0 | 150 × 5.5 | 140.5 | Flowable |
| 19 | 27.0 |  |  | 6.0 | 67.0 | 150 × 5.5 | 152.0 | Flowable |
| 20 | 27.0 | 0.6 |  |  | 72.4 | 3175 × 13 | 210.6 | Flowable |
| 21 | 27.0 | 0.8 |  |  | 72.2 | 3175 × 13 | 232.8 | Flowable |
| 22 | 27.0 | 1.0 |  |  | 72.0 | 3175 × 13 | 272.4 | Semi-flowable |
| 23 | 27.0 | 1.5 |  |  | 71.5 | 3175 × 13 | 442.6 | Semi-flowable |
| 24 | 27.0 | 2.0 |  |  | 71.0 | 3175 × 13 | 529.9 | Semi-flowable |
| 25 | 27.0 | 3.0 |  |  | 70.0 | 3175 × 13 | 634.0 | Not flowable |

[1]Viscosity measured with Thermo Electron Corporation Haake Viscometer 7 Plus.

Analysis of the Densities and Flexural Strengths of Polyurethane Composites

Polyurethane composites were prepared, in duplicate, using five different mineral wool RF825 compositions (as described in Table 3). The densities and viscosities of the polyurethane composites are shown in Table 3.

Figure 2:
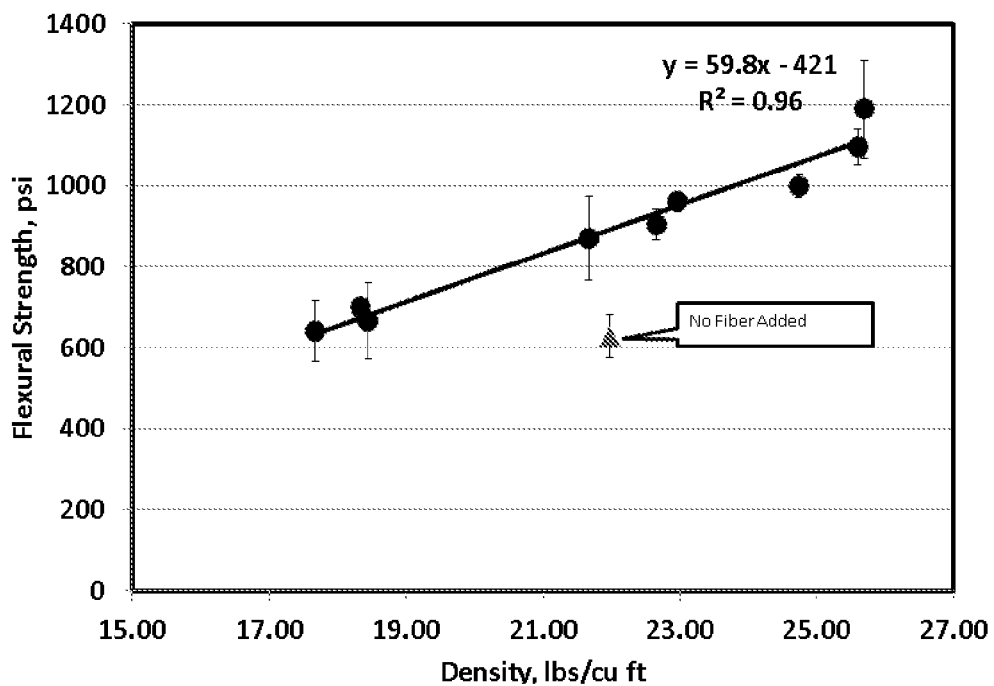
FIG. 2 is a graph showing the flexural strength of polyurethane composites with mineral wool, as a function of the composite's bulk density.

The flexural strength of the composites was plotted as a function of the density (FIGS. 1 and 2). The mineral wool provided an increase of about 20% in flexural strength to the polymeric composites.

TABLE 3

Effect of mineral wool fiber on the physical properties of polyurethane composites

| Content in Percent by Weight | | | Average | | | |
|---|---|---|---|---|---|---|
| Mineral Wool Fiber | PUR | Fly Ash | Average Density pcf | Stdev Density | Flexural Strength psi | Stdev Flexural Strength |
| 6.3 | 53.6 | 40.2 | 18.3 | 0.28 | 701 | 16.1 |
| 6.3 | 53.6 | 40.2 | 21.7 | 0.50 | 870 | 104.6 |
| 10.3 | 51.3 | 38.5 | 25.7 | 1.09 | 1189 | 122.3 |
| 6.3 | 53.6 | 40.2 | 25.6 | 0.20 | 1098 | 43.6 |
| 1.9 | 56.1 | 42.1 | 24.7 | 0.42 | 1000 | 27.8 |
| 1.9 | 56.1 | 42.1 | 18.4 | 0.46 | 666 | 95.6 |
| 10.3 | 51.3 | 38.5 | 17.7 | 0.32 | 641 | 74.5 |
| 0.0 | 57.1 | 42.9 | 22.0 | 0.78 | 628 | 52.8 |
| 4.1 | 54.8 | 41.1 | 22.7 | 0.49 | 904 | 37.3 |

Analysis of the Densities and Flexural Strengths of Polyurethane Composites

Six polyurethane composites were prepared, using varying compositions of mineral wool RF825, sand, filler, and polyurethane (as described in Table 4). The densities and flexural strengths of the polyurethane composites are shown in Table 4.

Figure 3:
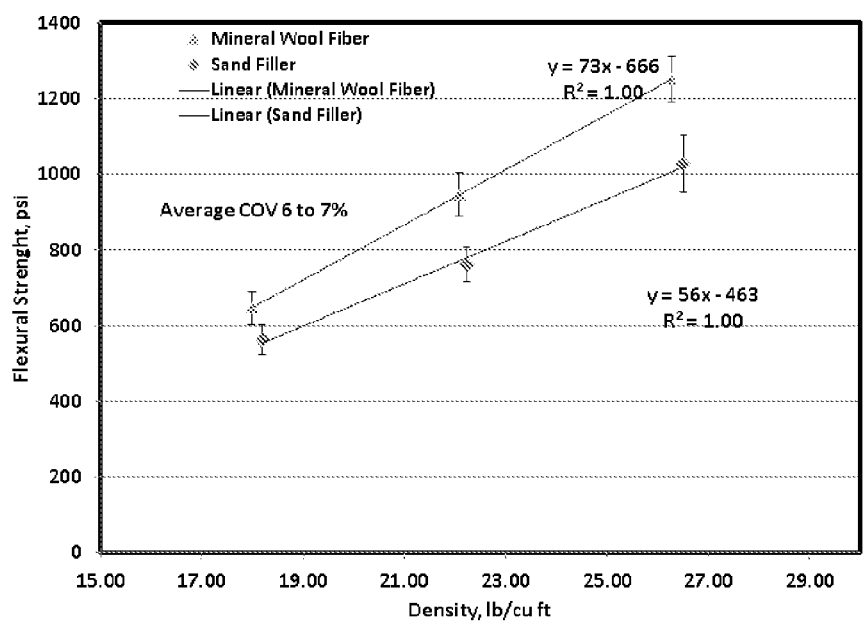
FIG. 3 is a graph showing the flexural strength of polyurethane composites with 7% mineral wool or 2% sand, as a function of the composite's bulk density.

The flexural strength of the composites was plotted as a function of the density (FIG. 3).

TABLE 4

Effect of mineral wool fiber on the physical properties of polyurethane composites

| Sample Name | Mineral Wool, % | Sand, % | Polyurethane, % | Fly Ash, % | Flexural Strength, psi | Density, pcf |
|---|---|---|---|---|---|---|
| 1 | 7 | 0 | 53.5 | 39.5 | 1252 | 26.28 |
| 2 | 7 | 0 | 53.8 | 39.2 | 947 | 22.08 |
| 3 | 7 | 0 | 54.1 | 38.9 | 646 | 17.98 |
| 4 | 0 | 2 | 51.2 | 46.8 | 1028 | 26.51 |
| 5 | 0 | 2 | 51.3 | 46.7 | 762 | 22.24 |
| 6 | 0 | 2 | 51.7 | 46.3 | 564 | 18.20 |

The compositions and methods of the appended claims are not limited in scope by the specific compositions and methods described herein, which are intended as illustrations of a few aspects of the claims and any compositions and methods that are functionally equivalent are intended to fall within the scope of the claims. Various modifications of the compositions and methods in addition to those shown and described herein are intended to fall within the scope of the appended claims. Further, while only certain representative materials and method steps disclosed herein are specifically described, other combinations of the materials and method steps also are intended to fall within the scope of the appended claims, even if not specifically recited. Thus, a combination of steps, elements, components, or constituents may be explicitly mentioned herein; however, other combinations of steps, elements, components, and constituents are included, even though not explicitly stated. The term "comprising" and variations thereof as used herein is used synonymously with the term "including" and variations thereof and are open, non-limiting terms. Although the terms "comprising" and "including" have been used herein to describe various embodiments, the terms "consisting essentially of" and "consisting of" can be used in place of "comprising" and "including" to provide for more specific embodiments and are also disclosed. As used in this disclosure and in the appended claims, the singular forms "a", "an", "the", include plural referents unless the context clearly dictates otherwise.

What is claimed is:

1. A composite comprising:
   (a) a polymer;
   (b) from 25% to 90% by weight of an inorganic filler comprising fly ash; and
   (c) a plurality of short length fibers having an average length of 650 μm or less.

2. The composite of claim 1, wherein the short length fibers have an average aspect ratio of length to diameter of 5:1 to 250:1.

3. A composite comprising:
   (a) a polymer;
   (b) from 25% to 90% by weight of an inorganic filler; and
   (c) a plurality of short length fibers having an average aspect ratio of length to diameter of 8:1 to 250:1, wherein the short length fibers are selected from the group consisting of mineral wool, cellulose, wood fiber, saw dust, wood shavings, cotton, lint, and combinations thereof.

4. The composite of claim 1, wherein the short length fibers are selected from the group consisting of mineral wool, cellulose, wood fiber, saw dust, wood shavings, cotton, lint, and combinations thereof.

5. The composite of claim 3, wherein the short length fibers have an average length of from 50 μm to 650 μm.

6. The composite of claim 1, wherein the short length fibers have an average length of from 100 μm to 250 μm.

7. The composite of claim 1, wherein the short length fibers have an average diameter of from 1 to 20 μm.

8. The composite of claim 1, wherein the short length fibers are present in an amount from 0.5% to 15% by weight, based on the total weight of the composite.

9. The composite of claim 1, wherein the inorganic filler is present in an amount from 50% to 80% by weight, based on the total weight of the composite.

10. The composite of claim 1, further comprising a plurality of glass fibers having a minimum length of 1 mm.

11. The composite of claim 10, wherein the glass fiber is present in an amount from 0.5% to 10% by weight, based on the total weight of the composite.

12. The composite of claim 1, wherein the polymer is selected from the group consisting of polyolefins, ethylene copolymers, polystyrenes, polyvinyl chlorides, polyvinylidene chlorides, polyvinyl acetates, polyacrylonitriles, polyamides, polyisobutylenes, polyacetals, chlorinated and fluorinated polymers, fluoroelastomers, fluorosilicones, polycarbonates, epoxies, phenolics, polyesters, acrylic polymers, acrylate polymers, polyurethanes, alkyds, silicones, styrene-butadiene copolymers, acrylonitrile-butadiene-styrene copolymers, nitrile rubbers, diallyl phthalates, melamines, polybutadienes, aramids, cellulosics, cellulose acetobutyrates, ionomers, parylenes, polyaryl ethers, polyaryl sulfones, polyarylene sulfides, polyethersulfones, polyallomers, polyimides, polyamideimides, polymethylpentenes, polyphenylene oxides, polyphenylene sulfides, polysulfones, polyetherketones, polyetherimides, polyarylenenketones, polychloroprenes, and blends thereof.

13. The composite of claim 1, wherein the polymer is a polyurethane formed by the reaction of at least one isocyanate selected from the group consisting of diisocyanates, polyisocyanates and mixtures thereof, and at least one polyol.

14. The composite of claim 1, wherein the composite has a density of 20 lb/ft$^3$ to 60 lb/ft$^3$.

15. A building material comprising the composite of claim 1.

16. A method of preparing a polyurethane composite, comprising:
   (a) mixing
      (1) 25% to 90% by weight of an inorganic filler based on the total weight of the composite;
      (2) at least one isocyanate selected from the group consisting of diisocyanates, polyisocyanates, and combinations thereof;
      (3) at least one polyol;
      (4) a plurality of short length fibers having a length of 650 μm or less; and
      (5) a catalyst; and
   (b) allowing the at least one isocyanate and the at least one polyol to react in the presence of the inorganic filler, and the plurality of short length fibers to form the polyurethane composite.

17. The method of claim 16, wherein the short length fibers are selected from the group consisting of mineral wool, cellulose, wood fiber, saw dust, wood shavings, cotton, lint, and combinations thereof.

18. The composite of claim 3, wherein the inorganic filler comprises fly ash.

19. A composite comprising:
   (a) a polymer;
   (b) from 25% to 90% by weight of an inorganic filler;
   (c) a plurality of short length fibers having an average length of 650 μm or less; and
   (d) a plurality of glass fibers having a minimum length of 1 mm.

20. The composite of claim 19, wherein the glass fibers are present in an amount from 0.5% to 10% by weight, based on the total weight of the composite.

21. A composite comprising:
   (a) a polymer;
   (b) from 25% to 90% by weight of an inorganic filler;
   (c) a plurality of short length fibers having an average length of 650 μm or less; and
   (d) a plurality of glass fibers, wherein the glass fibers are present in an amount from 0.5% to 10% by weight, based on the total weight of the composite.

22. A composite comprising:
   (a) a polymer;
   (b) from 25% to 90% by weight of an inorganic filler;
   (c) a plurality of short length fibers having an average length of 650 μm or less;
   wherein the short length fibers are selected from the group consisting of mineral wool, cellulose, wood fiber, saw dust, wood shavings, cotton, lint, and combinations thereof.

23. A method of preparing a polyurethane composite, comprising:
   (a) mixing
      (1) 25% to 90% by weight of an inorganic filler based on the total weight of the composite;
      (2) at least one isocyanate selected from the group consisting of diisocyanates, polyisocyanates, and combinations thereof;
      (3) at least one polyol; and
      (4) a plurality of short length fibers having a length of 650 μm or less, wherein the short length fibers are selected from the group consisting of mineral wool, cellulose, wood fiber, saw dust, wood shavings, cotton, lint, and combinations thereof; and
   (b) allowing the at least one isocyanate and the at least one polyol to react in the presence of the inorganic filler, and the plurality of short length fibers to form the polyurethane composite.

* * * * *